United States Patent [19]

Stern

[11] Patent Number: 5,049,878

[45] Date of Patent: * Sep. 17, 1991

[54] TWO-WIRE COMPENSATED LEVEL MEASURING INSTRUMENT

[75] Inventor: David M. Stern, Merion Station, Pa.

[73] Assignee: Drexelbrook Engineering Company, Horsham, Pa.

[*] Notice: The portion of the term of this patent subsequent to Jul. 25, 2006 has been disclaimed.

[21] Appl. No.: 336,008

[22] Filed: Apr. 10, 1989

Related U.S. Application Data

[60] Division of Ser. No. 615,151, May 29, 1984, Pat. No. 4,851,831, which is a continuation of Ser. No. 263,351, May 13, 1981, Pat. No. 4,485,673.

[51] Int. Cl.$^5$ ............................................. G08B 21/00
[52] U.S. Cl. ............................. 340/870.4; 340/870.6; 73/304 C; 324/60 C
[58] Field of Search ...................... 340/870.40, 870.16, 340/870.05, 870.11, 618, 620, 870.39; 73/304 C; 324/60 C, 61 R; 341/131, 167

[56] References Cited

U.S. PATENT DOCUMENTS

| | | | |
|---|---|---|---|
| 3,024,999 | 3/1962 | Heacock | 235/196 |
| 3,037,385 | 6/1962 | Franzel | 73/304 |
| 3,493,738 | 2/1970 | Keller | 364/850 |
| 3,515,000 | 6/1970 | Baumoel | 73/304 C |
| 3,652,930 | 3/1972 | Sugiyama et al. | 324/140 D |
| 3,659,277 | 4/1972 | Brown | 340/870.2 |
| 3,675,003 | 7/1972 | Snyder | 365/104 |
| 3,981,586 | 12/1976 | Scott | 364/850 |
| 4,024,533 | 5/1977 | Neumann | 341/167 |
| 4,093,946 | 6/1978 | Fowler | 340/310 R |
| 4,201,085 | 5/1980 | Larson | 73/304 C |
| 4,204,427 | 5/1980 | Gothe et al. | 73/304 C |
| 4,208,653 | 6/1980 | Abe | 340/870.02 |
| 4,208,909 | 6/1980 | Maltby et al. | 73/304 C |
| 4,222,267 | 9/1980 | Aldrich | 73/304 C |
| 4,232,300 | 11/1980 | Wright et al. | 340/870.39 |
| 4,235,106 | 11/1980 | Maltby et al. | 73/304 C |
| 4,250,490 | 2/1981 | Dahlke | 340/870.37 |
| 4,258,422 | 3/1981 | Dougherty et al. | 364/442 |
| 4,283,676 | 8/1981 | Shaw | 324/679 |
| 4,317,116 | 2/1982 | Macho | 340/870.39 |
| 4,347,740 | 9/1982 | Townsend | 73/304 C |
| 4,392,378 | 7/1983 | Pitches et al. | 73/304 C |
| 4,395,701 | 7/1983 | Evans | 341/131 |
| 4,444,051 | 4/1984 | Yamaki et al. | 73/304 C |
| 4,485,673 | 12/1984 | Stern | 73/304 C |
| 4,499,767 | 2/1985 | Fathauer et al. | 73/304 |
| 4,510,436 | 4/1985 | Raymond | 324/690 |
| 4,513,617 | 4/1985 | Hayes | 73/313 |
| 4,515,015 | 5/1985 | Kuhlman | 73/304 C |
| 4,518,956 | 5/1985 | Kitagawa et al. | 340/620 |
| 4,539,835 | 9/1985 | Shambroom et al. | 73/1 J |
| 4,674,329 | 6/1987 | Mulder | 73/304 C |
| 4,723,122 | 2/1988 | Maltby et al. | 73/304 C |
| 4,851,831 | 7/1989 | Stern | 73/304 C |

OTHER PUBLICATIONS

"The Art of Electronics", Horowitz and Hill, Transconductance and Amplifiers, pp. 64-66, Cambridge University Press (1980).

Primary Examiner—Donald J. Yusko
Assistant Examiner—Yuk H. Lau
Attorney, Agent, or Firm—Woodcock Washburn Kurtz Mackiewicz & Norris

[57] ABSTRACT

An improved system for generating a signal representative of the level of a material having a dielectric constant within a vessel is disclosed. The system features use of a first probe for generating a signal indicative of the dielectric constant of the material which is divided into a signal varying with the level of the material whereby a compensated level signal irrespective of the actual dielectric constant is measured. In a preferred embodiment, a single integrator is used to perform the division operation whereby inaccuracies due to component variation including long-term drift are eliminated. The instrument is disclosed as functioning in a two-wire instrument system having low power requirements, permitting use of conventional signal limits. Means for calibrating the instrument in a fail-safe manner such that the operator is assured of proper calibration are disclosed, as is means whereby bridge circuits used to measure in the capacitance measurements supplied to the division circuit are both supplied by a single oscillator means, again increasing reliability and accuracy of the system.

13 Claims, 13 Drawing Sheets

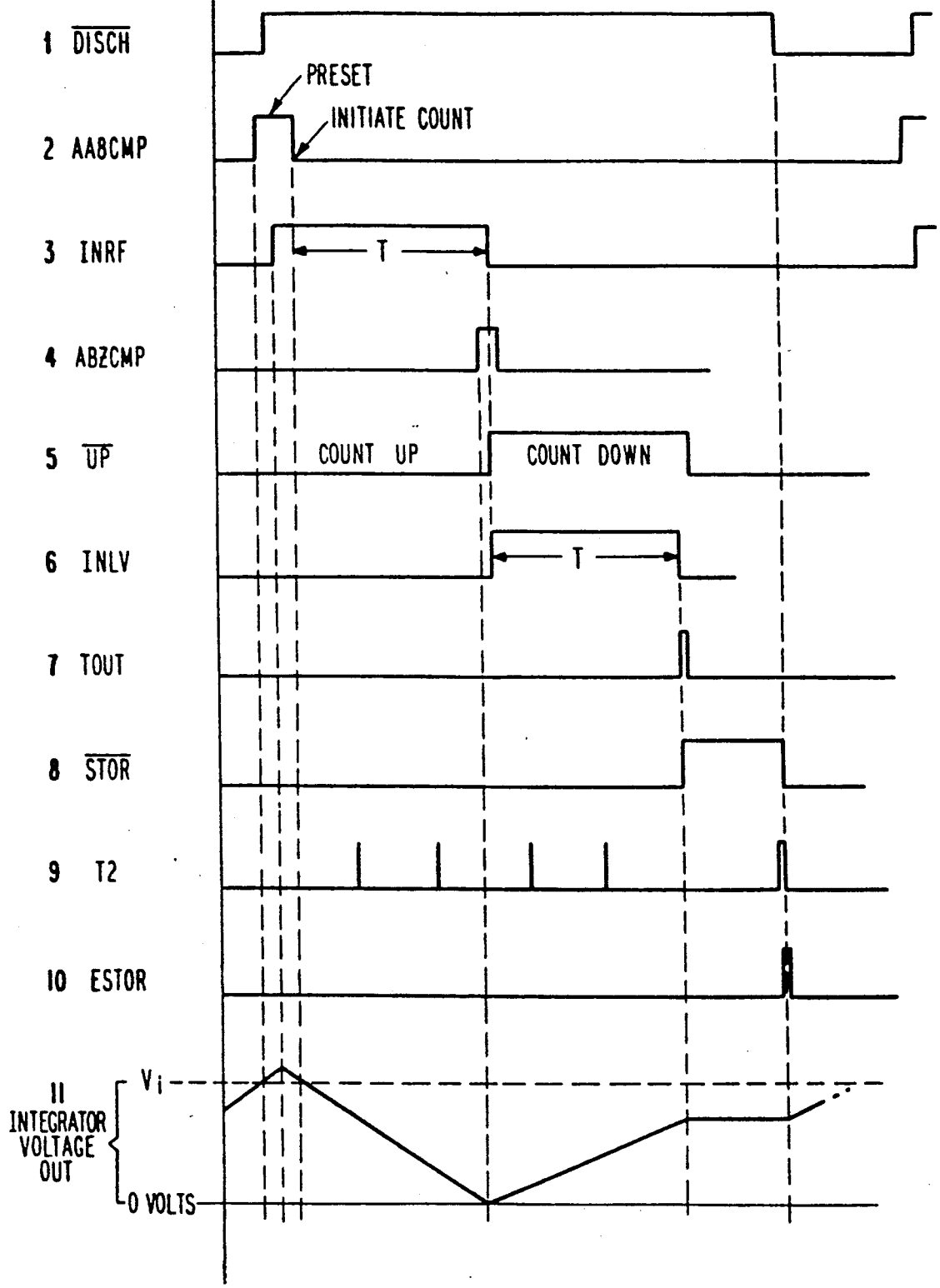

TWO-WIRE COMPENSATED LEVEL MEASURING INSTRUMENT

This is a division of application Ser. No. 615,151, filed May 29, 1984, now U.S. Pat. No. 4,851,831 which is a continuation of Ser. No. 263,351, filed 5/13/81 now U.S. Pat. No. 4,485,673.

FIELD OF THE INVENTION

This invention relates to the field of instrumentation and control. More particularly, the invention relates to methods and apparatus whereby a signal indicative of the level of a material within a vessel may be measured accurately and transmitted over a two wire connection; that is, one in which the power drawn by the level measuring instrument and the signal output by it are passed over the same wires.

BACKGROUND OF THE INVENTION

The prior art shows methods whereby a signal indicative of the level of a non-conductive material within a vessel may be measured by, for example, a capacitive probe. Moreover, the prior art shows methods whereby the signal may be compensated by a second signal indicative of the dielectric constant of the material being measured whereby the signal is indicative of the actual level of the material, even if the dielectric constant of the material changes from time to time. Such a corrected signal will be referred to hereinafter as a compensated signal. See, e.g., commonly assigned Wright et al and Maltby et al U.S. Pat. Nos. 4,232,300 and 4,208,909, respectively.

The prior art also shows systems in which signals of varying types are generated at a first location by an instrument and transmitted to a remote location for control purposes. In particular the prior art shows methods whereby the power used by the instrument in generation of the signal is transmitted over the same wires as is the signal itself. Two wires are generally adequate to achieve this purpose and hence these systems are known as two-wire systems. However, there has as yet been provided no two-wire true level measurement instrument.

As part of level measurement instrument systems there have been provided circuits for dividing one signal into another, e.g., for using a compensating signal indicative of the dielectric constant of a material to be measured as the denominator of a fraction, the numerator of which is the signal indicative of the level of the material. The quotient or result of the division is then the true level of the material. However, such division circuits as proposed in the prior art, for example, in Scott U.S. Pat. No. 3,981,586 have involved excess circuit complexity which would desirably be avoided. Furthermore, it will be appreciated by those skilled in the art that convention dictates that the signal levels passing over a two-wire current system be defined to be between 4 and 20 milliamperes (ma). Accordingly, the power drawn by the instrument cannot be greater than 4 ma. Typical prior art divider circuits involve several amplification stages which tend to draw more than this maximum current. For example, Hickock, Jr. U.S. Pat. No. 3,024,999, requires two ramp generators, while the Scott patent referred to above requires dual integrators. Other prior art divider circuits, such as shown in Keller U.S. Pat. No. 3,493,738 require duplicate circuitry for holding of reference and sample values, for example, dual resistor-capacitor networks. It will be apparent to those skilled in the art that the use of such paralleled components limits the accuracy of the system to the degree of identity of the values of the components, and that furthermore these values may vary in ways different from one another over time, such that the accuracy of the circuit is likely to deteriorate with time.

Another prior art ratio measuring scheme is disclosed in Sugiyama et al U.S. Pat. No. 3,652,930. This circuit requires an actual multiplication of two functions, which is difficult to implement inexpensively and accurately, and furthermore requires a theoretical approximation which may not be true in all cases.

OBJECTS OF THE INVENTION

Accordingly, it is an object of the invention to provide a method and apparatus for compensated level measurement, accurate measurement to be provided independent of material characteristics, independent of changes in probe characteristics and usable with materials having a wide variety of dielectric characteristics.

It is a further object of the invention to provide a measurement system useful under a wide variety of measurement conditions.

It is a further object of the invention to provide a compensated measurement system capable of two-wire operation.

It is a further object of the invention to provide such a two-wire compensated measurement system capable of high accuracy of measurement.

Yet a further object of the invention is to provide a level measurement instrument in which the signal processing and transmitter circuitry may be mounted remote from the materials being measured.

Yet a further object of the invention is to provide such a level measurement instrument in which the length of the cable connecting the transmitter circuitry to the probe is widely variable.

Yet another object of the invention is to provide compensated level measurement circuitry in which the signal falls between the conventional 4 and 20 ma levels.

A further object of the invention is to provide such a level measurement system in which an actual measurement of level is made with respect to actual ground potential, so that a second electrode need not be provided Yet a further object of the invention is to provide such a two-wire compensated level measurement system which is unaffected by material coatings on the probe.

A further object of the invention is to provide a level measurement system which is capable of ready precalibration prior to installation.

Still a further object of the invention is to provide a level measurement system employing a probe which requires but a single assembly for compensation and for level measurement purposes.

A further object of the invention is to provide a level system which can be adapted to compensate for differences in reference and level probe geometry.

A further and important object of the invention is to provide such a level measurement system which is capable of intrinsically safe operation, as that term is defined in the industry, both as to probe and as to the transmitter circuitry; that is, such that it does not draw a current capable of generating a dangerous spark.

Still a further object of the invention is to provide a level measurement system useful with probes having relatively short compensating electrodes, thus not requiring excessive space for installation.

Yet a further object of the invention is to provide a compensated level measurement system which continues to provide an accurate measurement even when the probes used to generate the reference signal are entirely uncovered.

A final object of the invention is to provide a level measurement system and probe satisfying the above needs of the art and objects of the invention which is furthermore rugged, reliable, inexpensive of manufacture and readily installable.

Other objects and aspects of the invention will no doubt appear to those skilled in the art.

SUMMARY OF THE INVENTION

The present invention satisfies the above mentioned needs of the art and objects of the invention by its provision of a two-wire capacitance level measuring system, the level measurement provided being independent of temperature effects and of variations in the dielectric constant of the material being measured. By combination of a compensating technique with ultra-low power circuitry, a very accurate two-wire instrument is provided which uses a highly accurate division circuit combining analog and digital circuit techniques, to generate an accurate analog quotient output.

In a preferred embodiment, the division process is performed using a single integrator circuit which is initially supplied with a initial voltage $V_i$. The compensating signal is then supplied to an input of the integrator causing its contents to diminish with time. The time taken for the integrator output to reach zero is measured; when zero is reached, the measurement—i.e., level—signal is input to the positive input of the integrator, causing its output to rise. The time of integration is controlled to be equal to that which was required for the output of the integrator output to drop from $V_i$ to zero. The ratio of the initially supplied $V_i$ to integrator output, after the measurement signal has been supplied to the integrator for a time equal to that taken for the integrator output to drop from $V_i$ to zero, is therefore equal to the ratio of the compensating signal to the level signal. Accordingly, division has been performed.

The output quotient signal is temperature- and humidity-independent and long-term variations in the integrator circuit characteristics do not affect the accuracy of its output., since it is continually being supplied with essentially new reference compensation information. The circuitry shown in the preferred embodiment provides the advantages and objects sought above, while requiring low power for both signal processing and for the division process. An analog signal which can be transmitted over the power supply line is generated, while digital control of timing, allowing use of time as a parametric dependent variable, is afforded. The measurement is delayable to compensate for high frequency variations in the measurement signal, and it is possible to provide multiple range operation for calibration of the instrument according to the invention for use with a wide variety of materials. The circuitry shown is adaptable for geometry compensation and for supply of auxiliary power to drive low resistance materials. Limited energy storage is required, again adding to the safety in operation of the invention, as the oscillator used to generate the AC signal used for the capacitance measurement requires low power.

A single oscillator may be used for both channels, again lending accuracy, reliability and stability. The signal processing channels may be matched to one another using isolated bridges, while a single guard shield may be utilized for both channels, thus again simplifying the construction of the probe and circuits of the invention. If the reference input signal is below a certain specified minimum, a synthetic reference signal may be developed, while if the transmitter is not being operated, a synthetic output signal may be supplied. Finally, the circuitry according to the invention is sensitive to small variations in the level being measured, as the probe is surrounded by a shield, and the level signal output by the circuitry according to the invention is invertible, which is useful in further signal processing. In addition to the novel two-wire compensated level signal provided by the apparatus of the invention and the novel use of the low power accurate analog divider circuitry using a single integrator element, the circuitry provided in the preferred embodiment supplies an integral calibration switch described in detail below and uses a common oscillator and exciter circuit, again for simplicity and accuracy of measurement.

BRIEF DESCRIPTION OF THE DRAWINGS

The invention will be better understood if reference is made to the accompanying drawings, in which:

FIG. 14 shows the timing diagram of the control logic circuitry of FIG. 13.

DETAILED DESCRIPTION OF THE PREFERRED EMBODIMENTS

This invention relates, as noted above, to a two-wire true-level measurement system. Its function is to provide a two-wire capacitance measurement independent of temperature effects and variation of the dielectric constant of the material being measured. It offers numerous novel features including the combination of the compensated technique with low power circuitry to provide an accurate two-wire instrument, and the provision of a low-power, high accuracy divider circuit which combines analog and digital circuit techniques to provide an analog quotient resulting from analog signal representations of numerator and denominator.

The present invention builds upon prior techniques described in commonly assigned U.S. Pat. Nos. 4,232,300 and 4,208,909, referred to above and incorporated herein by reference.

The basic technique for implementing the compensating function is well known. Compensation is effected by dividing the basic capacitance level measurement signal by a second signal obtained from an actual capacitance measurement of a known level of material. For example, a reference probe may be disposed in the bottom of a vessel for providing a signal indicative of the actual dielectric constant of the material; this signal may be divided into the signal derived from a sensor or probe which is more or less covered in response to variation in the level of the material to be measured. When this method is used with a vessel containing a homogeneous material with a proportional capacitance per vertical foot characteristic, an effectively compensated measurement is obtained. This technique is described in further detail in commonly assigned U.S. Pat. No. 4,235,106, incorporated herein by reference, which further describes methods for correcting the measurement for variations in geometry of the probes and vessel which are likewise useful in the practice of the present invention.

Figure 1:
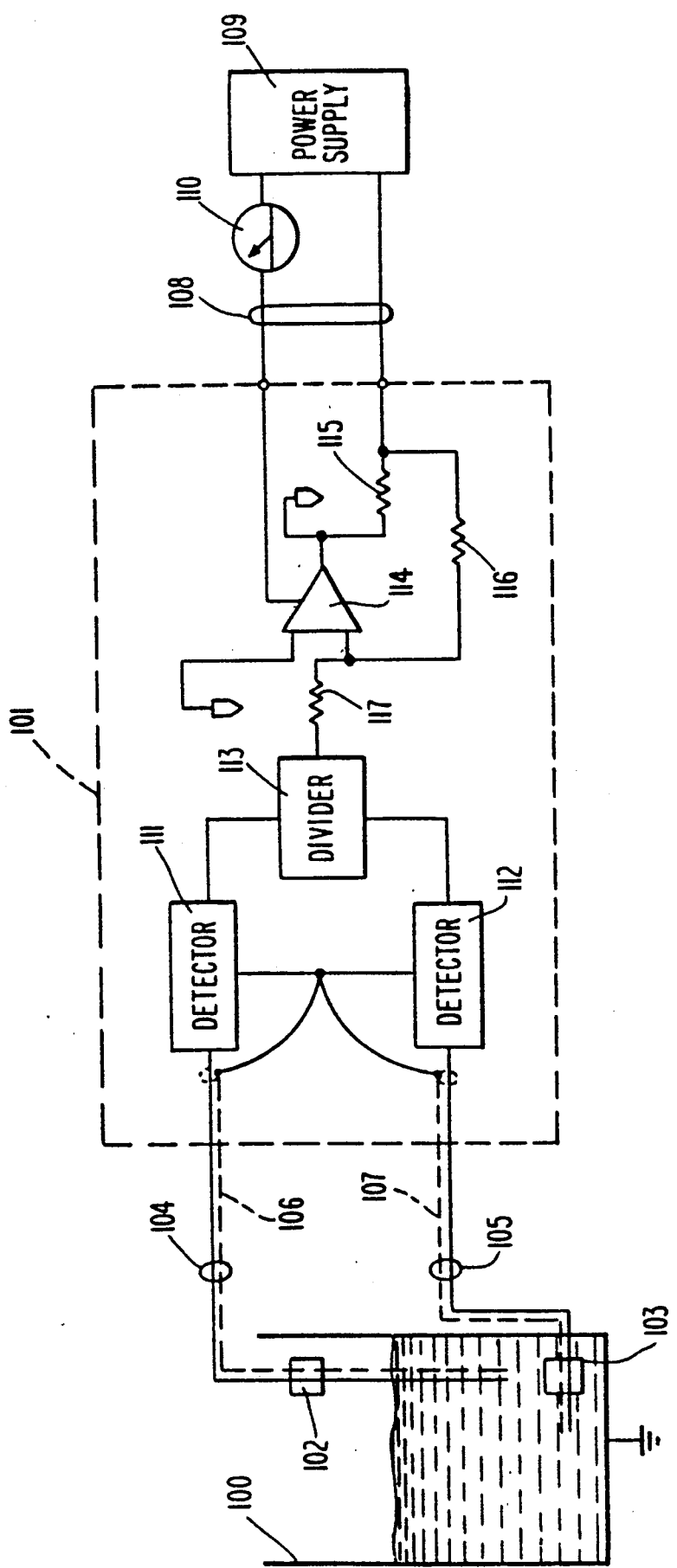
FIG. 1 shows a block diagram summary of the circuit of the apparatus of the invention.

FIG. 1 shows in block form the outline of apparatus conforming to the present invention. The capacitance measuring instrument or transmitter 101 is connected to capacitive sensors or probes 102 and 103 through coaxial cables 104 and 105. Sensors 102 and 103 are disposed within a conductive vessel 100 containing a material to be measured. The vessel 100 may be grounded without affecting operation of the instrument of the invention. A first probe 103 may be disposed at the bottom of the vessel so as to be covered, unless the vessel is substantially empty, for providing an indication of the dielectric constant of the material, while the second probe 102 may extend vertically within the vessel, thus being more or less covered in accordance with the level of the material to be measured within the vessel 100. The instrument is connected through a two conductor cable 108 to a signal indicating device 110 and a power supply 109. In the manner conventional for two-wire instruments, the two-wire cable 108 serves to conduct both the power needed to operate the instrument and the signal generated thereby.

The signal is provided by the amount of current drawn by the transmitter 101. It is conventional in the instrument industry for the signal to be standardized to remain within the range of 4 to 20 milliamperes. Given this convention, it will be understood that whatever functions are implemented by the design of transmitter 101, it cannot require a total current greater than the 4 milliampere minimum current; the output signal is then superposed on this base current.

Note that throughout this Specification, the term "transmitter" is used as defined by the ISA Standard 51.1 (1974), i.e., to denote a transducer and a means for outputting a signal.

The instrument 101 is comprised of capacitance detectors 111 and 112, dividing unit 113 and output amplifier 114 which uses output current sensing resistor 115, and gain setting resistors 116 and 117. The circuit of the invention associates functions and circuits which, acting together, provide the required result while having a total current consumption less than 4.0 milliamperes.

In FIG. 1, sensors 102 and 103 are connected to respective capacitance detector circuits 111 and 112 through coaxial cables 104 and 105. These sensors 102 and 103 may be reliably located at a distance from their detector circuits 111 and 112 because they are shielded by cable shields 106 and 107 which are each driven with a reference voltage corresponding to the voltage applied to the associated center wires of the coaxial cables. It is convenient to use the same shield (reference) voltage on each of the two cables. When the two sensors are combined into a single physical structure, it becomes a practical necessity to have this common shield voltage. This in turn implies that the excitation applied to the center wires of the two cables must be nearly equal to each other.

In the system shown in FIG. 1, the detector circuits 111 and 112 include the circuitry for providing the excitation signal for the system; see commonly assigned U.S. Pat. Nos. 4,232,300 and 4,208,909. The detected analog capacitance signals provided by detectors 111 and 112 are applied to the two inputs of divider circuit 113. The analog output of the divider circuit 113 is applied to resistor 117. The output of divider 113, which represents the capacitance level signal divided by the reference capacitance signal, is the basic compensated level signal. Transconductances amplifier 114, sensing resistor 115, and gain setting resistors 116 and 117 combine to produce a circuit having the characteristic that it produces an output current proportional to the compensated level signal voltage applied to resistor 117. The amplifier 114 has a first input, controlled by resistor 117, and a second input connected to circuit common. (The symbol used for circuit common in FIG. 1 will be used in FIGS. 1 and 2 to distinguish this common potential from a true earth ground, for which the conventional symbol is used.)

Figure 2:
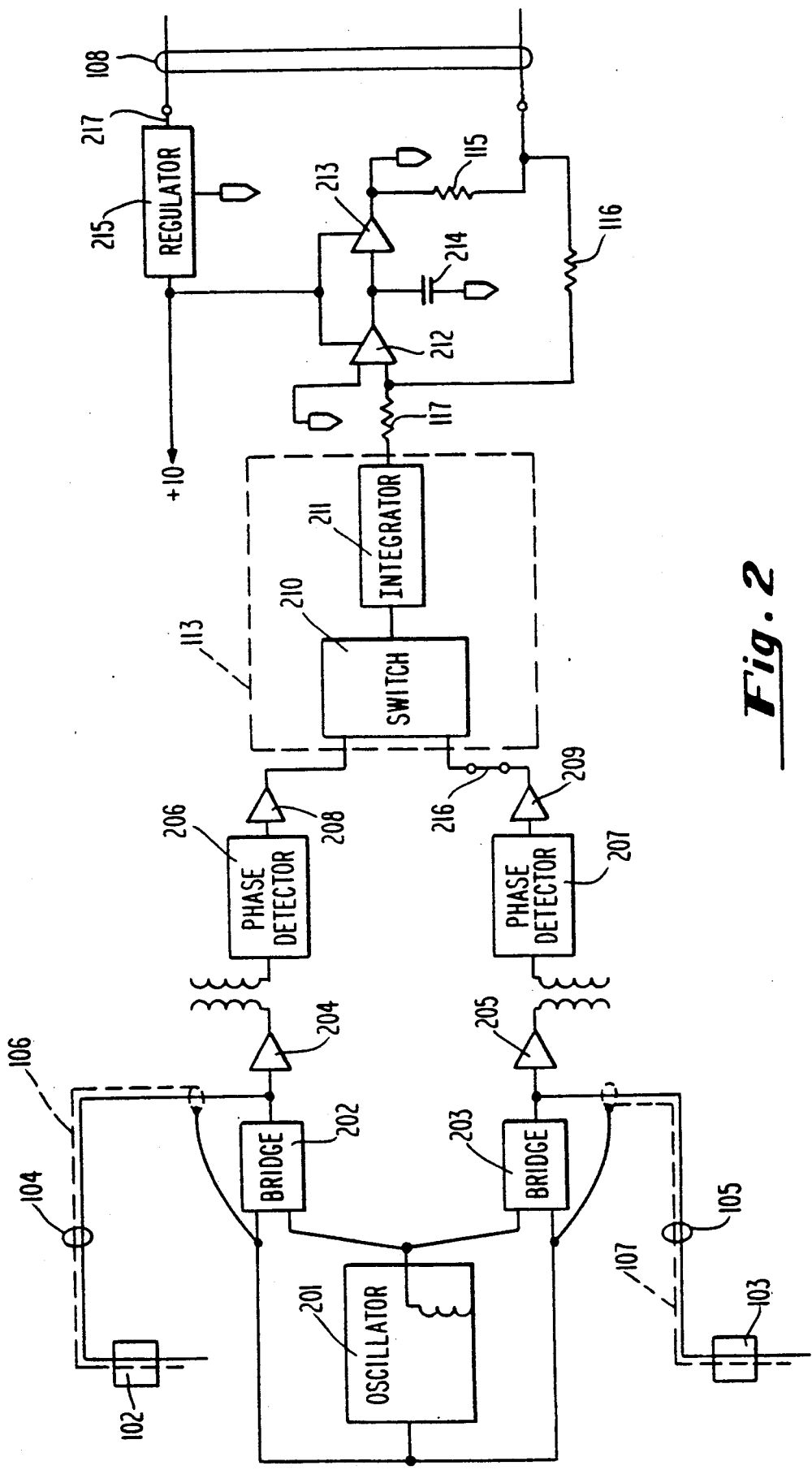
FIG. 2 shows the circuit of FIG. 1 in greater detail.

The system of FIG. 1 is shown in greater detail in FIG. 2. Here the oscillator detector circuits referenced as items 111 and 112 in FIG. 1 are now broken down into items 201 through 209. An oscillator circuit 201 producing sine waves is transformer coupled to parallel bridge circuits 202 and 203. These bridge circuits 202 and 203 are each adjusted to provide a zero signal when the associated sensors 102 and 103 respectively are in air and a maximum signal, producing a 20 milliampere output current, when the sensors are fully covered with the material having the highest dielectric constant sought to be measured by a particular embodiment of the invention.

Stable AC amplifiers 204 and 205 connect to their respective bridges so that their output level is responsive to bridge imbalance caused by sensor to ground capacitance. The output of each amplifier is transformer coupled to phase sensitive detector circuits 206 and 207. The output from each detector is a voltage level whose magnitude represents the change from the zero-condition capacitance at the sensors. These small signals are next amplified by stable DC amplifiers 208 and 209. The signals provided by amplifiers 208 and 209 thus represent respectively the dividend and divisor signals required by the analog divider circuit 113.

It should be noted that the excitation applied to the bridge circuits 202 and 203 is transformer coupled from the oscillator circuit 201. Also, the signals produced by the error amplifiers 204 and 205 are transformer coupled out to their associated detector circuits. Similarly, the power required to operate the error amplifiers 204 and 205 may also be supplied by transformer coupling of these circuits. Thus, all circuitry associated with the sensors 102 and 103, which may be placed in a hazardous environment or explosive atmosphere, is carefully isolated from all other circuitry in a manner which restricts the amount of energy which can be transmitted to the sensors. In this manner, an object of the invention—to perform the compensated measurement in a manner which provides intrinsically safe sensor circuits—is achieved. However, it will be understood that transformer coupling is but one of several methods that can be used to provide safe sensor circuits.

The divider circuit 113 is fundamentally comprised of an analog switch 210 and an integrator circuit 211. As will be described in detail below, this circuit combination, when properly controlled, provides a very low power, accurate analog voltage divider function. The output of the divider circuit 113 is a varying voltage signal which at a specified time within its operating cycle provides a stable voltage signal representing the quotient of the two input signals. At this point, it should be noted that the DC amplifiers provided by conventional operational amplifier circuits 208 and 209 provide output signals which explicitly represent measurements corresponding to the capacity applied to the level and reference channel sensors 102 and 103, respectively. The explicit availability of the reference channel signal from the output of amplifier 209 satisfies another object of this design, which is to provide an instrument which is compatible with use of the geometry compensation function described in commonly assigned U.S. Pat. No. 4,235,106 referred to above. When using the geometry compensation function with the instrument of FIG. 2, jumper connection 216 is opened and the geometry function is inserted between the two terminals of jumper 216. The geometry compensation function thus receives a signal representing the reference channel capacity and produces a modified reference channel signal which is then the divisor signal for the divider circuit 113.

Because the quotient of the divider circuit 113 is not continuously available, the output amplifier circuit, which receives the output signal from the divider, includes a storage and hold function. The overall function of the output amplifier circuit then is to receive the intermittent quotient signal, to store an analog representation of the signal, and to produce a continuous output current signal which equals a constant base value (4.0 milliamperes) plus a signal current covering the range of 0 to 16 milliamperes. The active elements of the output amplifier circuit are transconductance amplifiers 212 and 213. The amplifiers 212 and 213 operate within a negative feedback loop comprised of resistors 115, 116, and 117 which insures a very stable gain controlled function. Resistor 116 has a high ohms value and resistor 115 has a very low ohms value. Resistor 115 is effectively in series with the total current load used by the instrument 101; thus, the voltage drop across it is a reliable measure of the current drain of the instrument. The voltage developed across this current sensing resistor is fed back through resistor 116 to amplifier 212 providing a means for the amplifiers 212 and 213 to be responsive to the current of the output signal loop carried on wire pair 108. A regulator circuit 215 provides a constant voltage for the circuitry of FIG. 2.

The output amplifier circuit has two modes of operation, a storage mode and a holding mode. In the storing mode, amplifiers 212 and 213 function as a pair of series connected gain elements operating together as a single gain element working within the feedback loop established by resistors 115 and 116. That is, the amplifiers 212 and 213 develop a signal such that the voltage drop between the inverted signal (relative to the input signal) developed across resistor 115 and the input provided by the quotient from integrator circuit 211 controls the voltage at the junction of resistors 116 and 117 to be essentially at the circuit reference potential. Thus the voltage drop across resistor 115 and hence the loop output current can be accurately controlled by the output voltage of integrator circuit 211. In the storing mode with the amplifiers operating as just described, the signal levels associated with the amplifiers 212 and 213 are automatically adjusted to be compatible with the input and output conditions dictated by the feedback connections. In particular, the voltage across storage capacitor 214 is automatically adjusted during the storing mode to be compatible with the required conditions.

This situation sets up the required conditions for proper operation during the time of holding, i.e., while the output amplifier circuit is in the hold mode. In this mode, the amplifier circuit continues to generate an output current but it is totally unresponsive to the signal provided by integrator circuit 211, and the magnitude of the output current generated by the amplifier is representative of the last signal provided by the divider circuit at the time the amplifier switched from its storage to its hold mode of operation.

To effect the hold mode, amplifier 212 has the special characteristic of being able to turn OFF in response to an electronic signal applied to its control terminal. This type of amplifier is now relatively common; RCA type CA3080 is representative of this class. The significant characteristic of amplifier 212 is that in its OFF state, its output terminal, i.e., the terminal connected to capacitor 214, assumes a very high input impedance condition and provides no current. Thus, under the condition of hold, with amplifier 213 being supplied with a very high input impedance, the charge on and consequently the voltage across capacitor 214 remain undisturbed. Amplifier 213 is a conventional operational amplifier integrated circuit. Its operation is the same independent of the mode of the amplifier system. Therefore, whatever output condition is established for amplifier 213 during the store mode is maintained during the hold mode due to the storage characteristic of capacitor 214. During the hold mode, capacitor 214 is operating in an open loop condition without the benefit of negative feedback. However, since the duration of the hold mode is kept to a fraction of a second, a negligible amount of drift in the output current occurs. Longer term drifts are compensated as soon as the circuit returns to its store mode and the feedback connections are again established.

A low power regulator circuit 215 forms part of the circuitry of the instrument. The regulator is in series with the positive connection 217 and produces a voltage level with respect to circuit common of +10 volts. The regulator circuitry 215 is designed to operate over a voltage range between the conductors 108 of 13 to 100 volts thereby allowing the instrument to function with a wide variety of input conditions. By utilizing circuitry 215 to absorb the excess voltage across line pair 108, the voltage across amplifier 213 is held essentially constant and the output amplifier circuitry can be optimized for current stability, and low power consumption.

Figure 3:
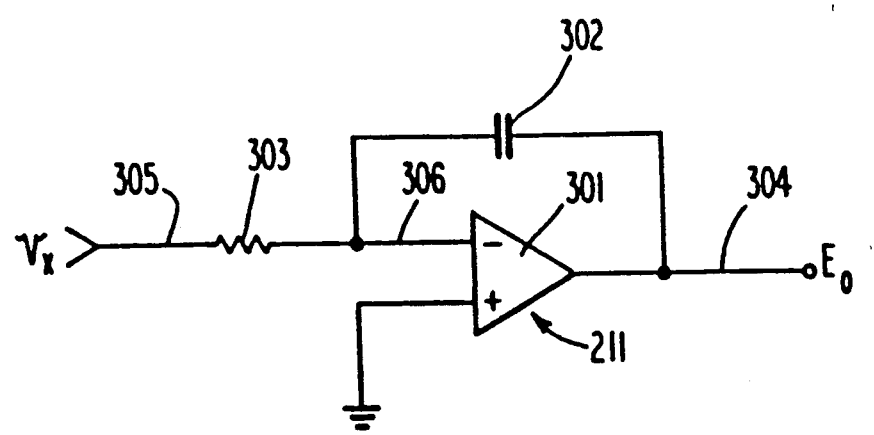
FIG. 3 shows details of an integrator circuit shown in FIG. 2.

The operation of the divider circuit 113 is explained by first considering the integrator circuit 211 shown in greater detail in FIG. 3. The circuit comprises a low power operational amplifier gain element 301, integrating capacitor 302 connected as a negative feedback element from the circuit output 304 to the amplifier feedback terminal 306, and a resistor 303 which conducts the input signal $V_x$ from wire 305 to terminal 306. The relation between the input voltage $V_x$ and the output voltage $E_o$ is given by equation (1)

$$E_o(t) = 1/RC \int V_x \cdot dt \quad (1)$$

When $V_x$ is a constant voltage, $$E_o(t) = (1/RC) \cdot V_x \cdot t + \text{Constant} \quad (2)$$

Figure 4:
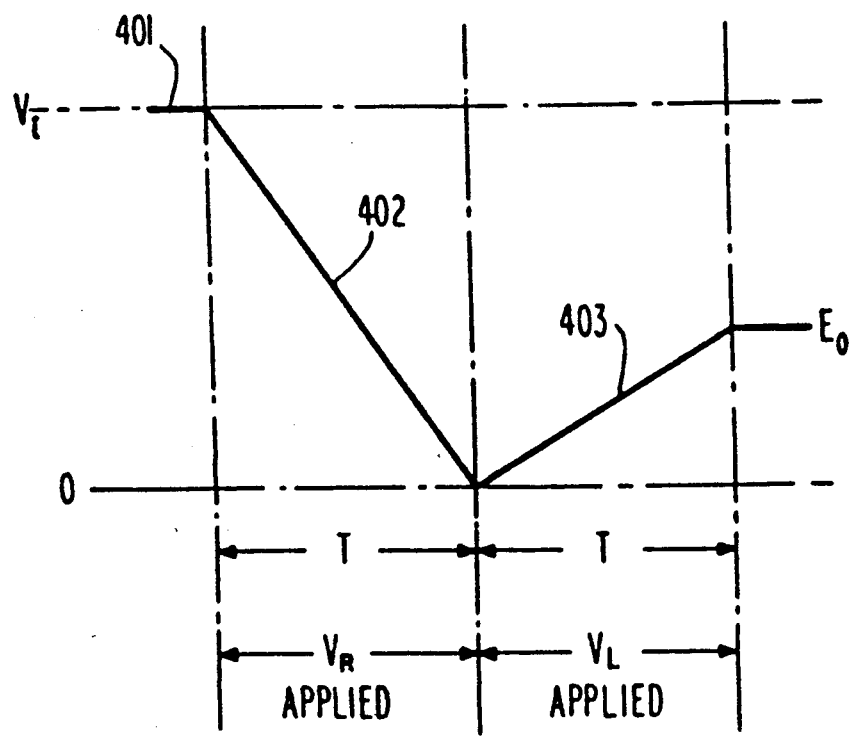
FIG. 4 shows a plot representing the operation of the integrator circuit of FIG. 3.

The divider circuit of FIG. 2 is used to achieve a division function by following the regime of actions outlined in FIG. 4. The waveform described in FIG. 4 represents the output waveform generated by the integrator 211 (FIG. 2). Initially, the integrator output is reset to a reference voltage level 401, $V_i$, as indicated. Thereafter, a positive voltage $V_R$, indicative of the denominator of the ratio of interest, here the compensation or reference signal $V_R$, is applied to the input of the integrator circuit. This results in the falling ramp voltage shown at 402. The ramp 402 continues until the integrator output voltage level equals zero, or another predetermined value. This action requires a variable time T, dependent in the example on the dielectric constant of the material, the level of which is to be measured. Thereafter, the voltage $V_R$ is removed from the integrator input and a negative voltage $V_L$ is applied to the integrator input. This action results in the positive ramp shown at 403. Ramp 403 starts at zero volts and is controlled to continue for a time exactly equal to T. At this time, the output voltage of the integrator is $E_o(T)$, a value which is directly proportional to the ratio of $V_L/V_R$; that is, to the compensated level. By removing all input signals from the integrator, the quotient value remains constant for a time of a few milliseconds, when the quotient signal may be transferred into the output amplifier.

The division result is derived mathematically starting from Eq. 2. Starting with the integrator initially set to an output level of $V_i$ and, applying a voltage signal $V_R$ representing the reference channel signal level to the input of integrator 301, then, $$E_o(t) = V_i - V_R t/RC \quad (3)$$

As seen in FIG. 4, the negative ramp 402 continues until a time T at which time $E_o(t) = 0$. Thus, $$O = V_i - V_R T/RC \quad (4)$$

$$T = (V_i/V_R)RC \quad (5)$$

Next, the negative signal $V_L$, representing the level channel signal, is applied to the integrator input. This action produces ramp signal 403. $V_L$ is applied to the integrator for a time exactly equal to T. Then, $$E_o(T) = (1/RC)V_L T. \quad (6)$$

Substituting for the value of T from Eq. 5, produces, $$E_o(T) = (1/RC)V_L (V_i/V_R)RC \quad (7)$$

$$E_o(T) = V_i (V_L/V_R) . \quad (8)$$

Thus, it is shown that the sequence of events summarized by FIG. 4 produces a signal level, $E_o(T)$, which is proportional to the ratio of the level channel signal, $V_L$, to the reference channel signal $V_R$, and is equal to this ratio times the readily controllable initial voltage $V_i$.

Stated differently, division is performed by supplying an initial condition $V_i$ to the integrator, supplying a first signal (i.e., the reference signal) to the integrator, measuring the time T taken for the integrator output to reach a second predetermined level, e.g., zero, (and hence measuring the rate of integration), supplying the second signal to the integrator for a like time T, and generating as the quotient the ratio of the output of the integrator $E_o$ at time 2T to $V_i$.

A major distinction of this divider circuit compared with the prior art is that the use of a single integrating circuit, as in the present case, permits the RC factors seen above in Eq. 7 to be canceled out thereby minimizing the opportunity for errors due to long-term component drift. Compare Heacock U.S. Pat. No. 3,024,999. This approach thus also minimizes the requirement of precision analog components. Furthermore, this design by integrating both the analog numerator and denominator signals provides a considerable degree of noise immunity as compared with the prior art as exemplified by Myer U.S. Pat. No. 3,209,135, where only the denominator signal is integrated.

The bridge circuits 202 and 203 of FIG. 2 are capacitance bridge circuits utilizing a common excitation provided by the oscillator circuit 201. The use of a common excitation means for both the reference and level measurement channels contributes to three of the objectives of the design. By utilizing a single oscillator circuit and a single associated transformer, the power requirement for the bridge function is minimized. Secondly, the use of a transformer for coupling the required AC bridge excitation signal to the bridge circuits contributes to the intrinsic safety of the sensor-associated circuits by providing a means of high voltage isolation between the sensors and the measuring systems, as mentioned above. Thirdly, the accuracy of the resultant level measurement is enhanced. By using the same (or proportional) voltage levels for the bridge excitation signal in both the level and reference circuits the resultant ratio of these measurement is found to be independent of the excitation level $V_i$ and consequently, independent of any variation in this level. Again, see commonly assigned U.S. Pat. No. 4,235,106.

Figure 5:
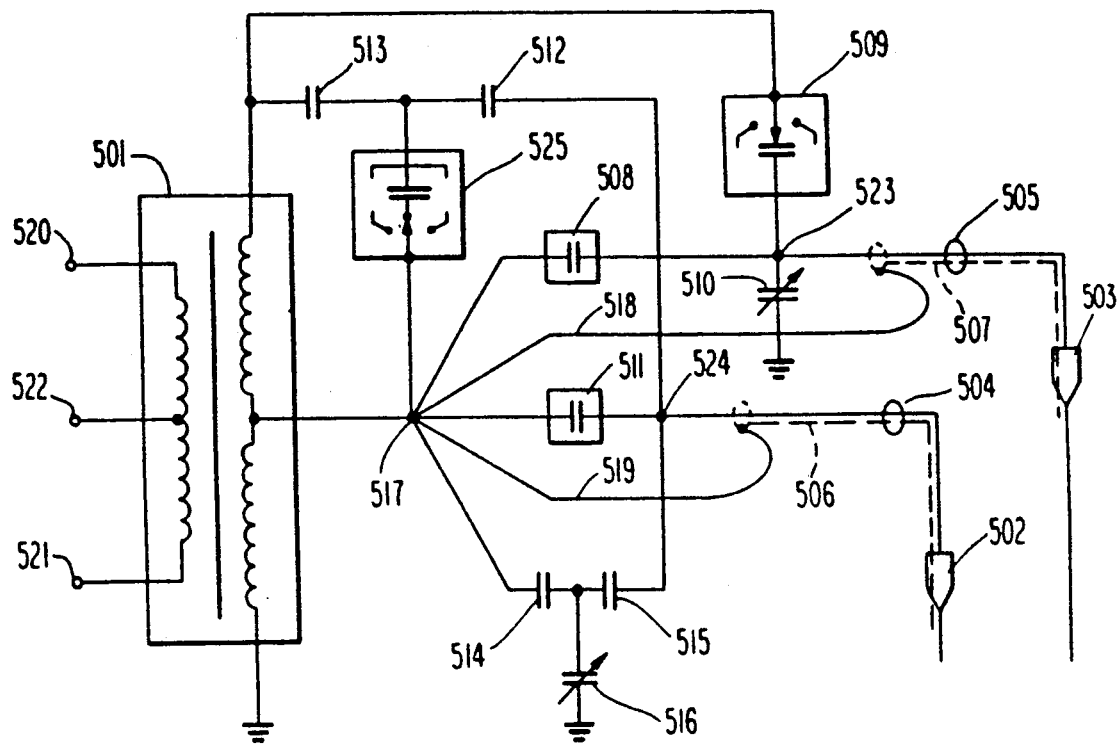
FIG. 5 shows a detailed schematic of a bridge circuit employed in the preferred embodiment of the invention.
Figure 11:
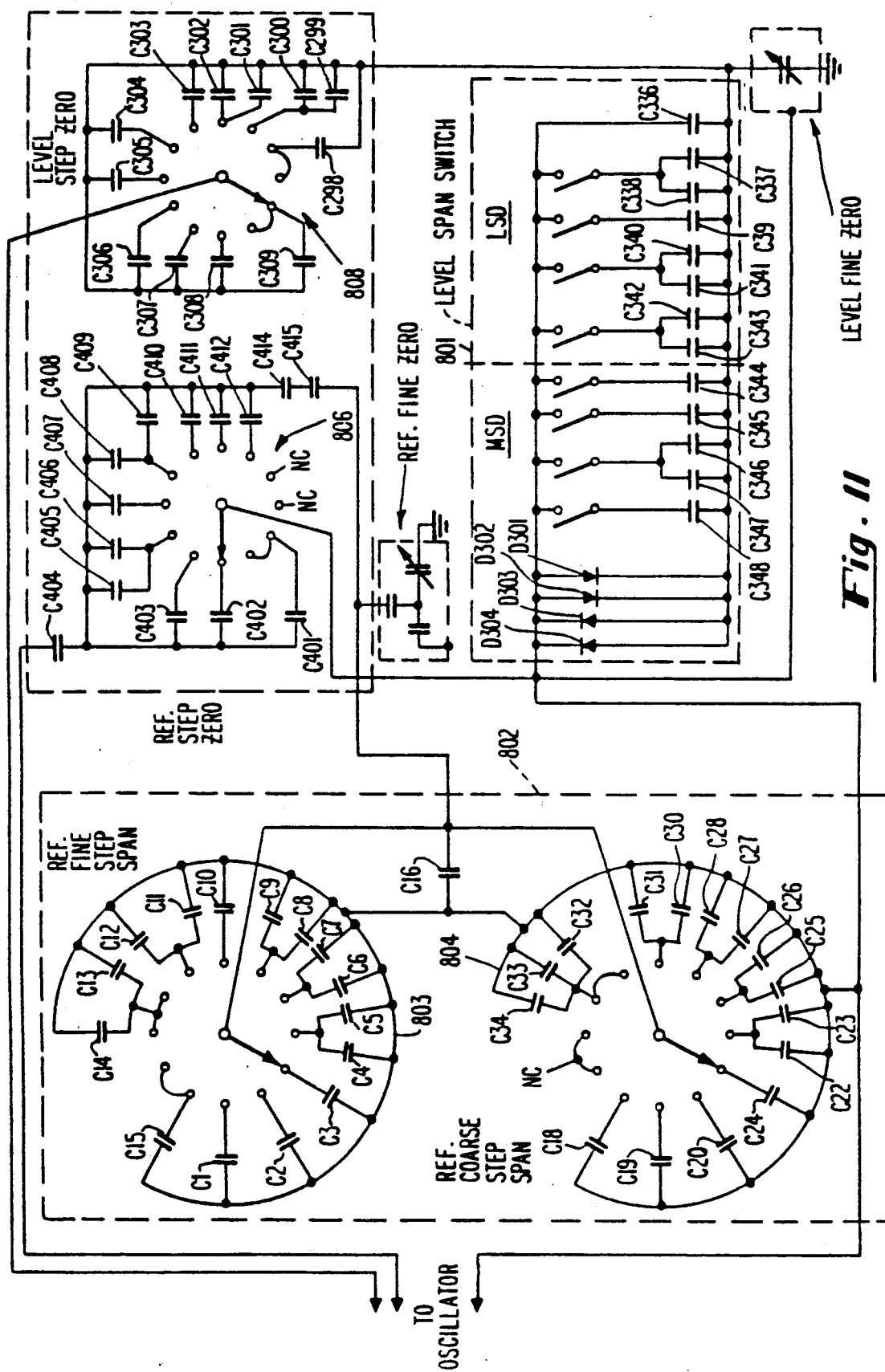
FIG. 11 shows details of the bridge circuits for both the reference and level channels.

FIG. 5 provides a detailed description of the bridge circuit. The bridge excitation is provided by the voltage generated across transformer 501. The transformer is driven in turn by the oscillator circuitry connected to transformer primary winding terminals 520 and 521, and primary center tap terminal 522. In FIG. 5, the level channel sensor is seen as element 503 connected to the bridge circuitry by coaxial cable 505. The sensor 503 can be considered a ground-referenced capacitor forming part of the ground leg of the level channel bridge circuit. The walls of the vessel containing the material being measured are employed as the second electrode of the "material capacitor". It is thus most convenient to use the "material capacitor" as a ground-based element, as shown. Connected in parallel with the material level capacitor is a zeroing capacitor 510. This element is continuously adjustable over its range and is used for fine adjustment of the zero capacity desirably detected when air alone surrounds the sensing element. Capacitive element 509, discussed in detail below in connection with FIG. 11, represents the upper leg of the level channel bridge. To zero the bridge, capacitive elements 509 and 510 are adjusted to provide an excitation signal level at junction 523 which exactly matches the signal level at junction point 517. In a preferred embodiment, element 509 is a switched array of capacitors. This is used to bring any bridge zero unbalance within the lesser range of the continuously variable capacitor 510.

The level channel bridge output signal is developed between points 517 and 523. This signal is most conveniently developed across a capacitor element 508 connected between points 517 and 523. Thus, at bridge balance (zero condition) there is no voltage differential between these points and there is a zero bridge signal. As the material to be measured increasingly surrounds the sensor 503, and its capacity increases, the AC voltage developed at point 523 decreases, the bridge becomes unbalanced and a voltage is developed across capacitor 508. As taught in U.S. Pat. No. 4,235,106, incorporated herein by reference above, when capacitor element 508 is selected to be judiciously large, the voltage developed across it is seen to have a near linear relation to the magnitude of the capacity change associated with sensor 503. Consequently, the bridge unbalance voltage provides the desired measurement signal. Thus, the capacitor element 508 provides a switched proportional gain factor and is used to adjust the span, i.e., the adjustment range of the instrument.

In addition, with capacitor 508 selected to be very large, then the A.C. voltage across it is very small, and the voltages at points 517 and 523 are very nearly equal. This condition allows the voltage developed at point 517 to be used as the shield voltage to drive the coaxial shields 507 and 506 associated with the cables connecting to the level and reference sensors 503 and 502, respectively. Where the level and reference sensors are combined within a single mechanical structure as taught in U.S. Pat. No. 4,208,909, referred to above, it is clearly desirable to have such means for providing a common shield voltage for the level and reference channels. Furthermore, when packaging the circuits corresponding to the system of FIG. 2, it is desirable to physically shield the components of the bridge circuits and error amplifier circuits (i.e., 206, 207, 208 and 209) from capacity to ground. Again, having the shield elements of both channels at the same voltage potential greatly facilitates the physical construction of this shielding since all the shield elements can be in electrical contact without deleterious results.

An important feature required of a compensated measurement system is that it be immune to changes in the dielectric constant of the material the level of which is to be measured. It is observed experimentally that this immunity is improved when the system is calibrated to operate according to the following span conditions:

$$\frac{C_{lev\,span}}{C_{lev}} = \frac{C_{ref\,span}}{C_{ref}}$$

That is, the ratio of the span capacitor of the level channel to the full scale change in capacity of the level sensor should equal the ratio of the span setting capacitor of the reference channel to the full variance possible in capacitance of the reference channel. To obtain sufficient resolution to approximately satisfy the required condition, the level channel span capacity assembly 508 is implemented with binary weighted span capacity values and a two-digit binary coded, level channel, span selector switch. With sufficient resolution in the level channel span selector, it is not necessary to have a comparable degree of span resolution in the reference channel. This condition has the effect of reducing the compensation error from a range of 0.35% to the range of 15%. It is believed that this improvement is due to better accommodation of the residual nonlinearities associated with the large span capacitor approximation.

The electrical design of the level channel bridge as described hereinabove conforms to the prior art as described in U.S. Pat. No. 4,232,300 referred to above. However, in the present invention two bridge circuits are combined with a single oscillator - excitor circuit, where the reference uses two oscillators.

Referring again to FIG. 5, the reference channel bridge is composed of capacitance elements 511, 512, 513, 514, 515, 516 and 525. In principal, it is similar to the circuit of the level channel bridge. However, it differs in detail due to the very small zero and material change capacitances characteristic of the reference channel sensor. In general, the physical length of the electrode of reference sensor 502 is short. Where this electrode is vertically mounted, a short electrode is desirable, since it must always be covered. Whatever length is assigned to the reference element represents a length which cannot be effectively measured. The short length of reference sensor 502 in turn implies that the electrode will have a very small zero material capacitance and that the reference channel will have to be able to operate with signals representing very small changes in capacity. These requirements in turn require the reference channel to have particularly good shielding and stability. Shielding is effected by carefully surrounding all sensitive areas with the shield potential, and stability is accomplished by using components, where a system sensitivity exists, that are relatively inert to environmental factors. Finally, every effort is made to employ a system design that minimizes the stability requirements on any particular component. In this regard, by way of example, the operation of the coaxial cable 504, having its shielding conductor 506 maintained at the shield potential of node 517, effectively eliminates any significant requirement for the center wire of either of cables 504 and 505 to have rigid mechanical stability in regard to its surroundings. In a like manner, shielding the bridge components from ground also minimizes any significant mechanical rigidity requirement.

Capacitor 512 of the reference channel bridge circuit serves as the upper leg of the bridge and is analogous to element 509 of the level channel bridge. This upper bridge leg is used to provide a means of nulling the probe circuit load represented by the zero capacity of the probe circuit. Because the zero capacity of the reference channel is very small, typically on the order of one picofarad, the corresponding bridge element 512 would have to be very small. The instability problems associated with the stray capacity to capacitor 512 are minimized by exciting it with a reduced amplitude signal and thereby allowing it to have a significantly larger value. The reduced excitation on capacitor 512 is effected by a capacitor attenuator circuit composed of capacitor 513 and the switched capacitor array 525. By switching in different capacitor values in element 525, the zeroing reduction effect of capacitor 512 is increased or decreased according to whether the equivalent capacity of 525 is correspondingly larger or smaller.

A further improvement is effected in the bridge zero stability by operating the body of the switch, associated with element 525, at the AC shield reference potential. In this way, the stray capacity associated with the switch terminals is effectively capacity to the shield rather than capacity to the chassis (ground). In this configuration, the stray capacity has a reduced AC potential across it and its effect is correspondingly reduced. Also, the capacitors of 525 tend to have relatively large values (particularly when a small zero capacity is being nulled) so that stray capacity in parallel with the capacitive element will have but a small effect.

While the switchable capacitor array 525 provides the means for coarse, step-wise zero adjustment of the reference channel bridge, variable capacitor 516 provides means for a reduced range continuous adjustment of the bridge zero. The effect of the variable capacitor 516 is attenuated by capacitors 514 and 515. This attenuation has the dual purposes of attenuating the absolute effect of changes in the variable capacitor 516 due to changes in temperature, and of increasing the resolution of the variable capacitor setting. It is desirable to have an effective resolution of 1/1000 of a picofarad.

The attenuation function is understood by noting that the current which would normally be drained from junction point 524 through capacitor 515 is reduced by the series combination of capacitor 514 and 516. This combination has the effect of reducing the amplitude of the AC voltage across capacitor 515 and consequently reducing the current drained through it. Variation of the size of capacitor 516 changes the voltage attenuation ratio and consequently changes the voltage signal across capacitor 515. The attenuation reduces the total range of the capacitance to ground adjustment and at the same time increases the resolution of the setting effected by varying capacitor 516. In the present design, the attenuation produces a control range of about 7 pf. and a resolution, for a 2° control shaft rotation, of about 0.003 pf.

In summary, the series elements 515 and 516 operating in parallel with the capacity to ground associated with probe 502 provide the bottom leg of the reference channel bridge. The upper leg of the bridge is provided by capacitor 512 effectively controlled by switched capacitor array 525. This array is set by its associated switch to provide a coarse adjustment of the bridge zero. Fine adjustment is then accomplished using element 516.

Analogous to the functions of the level channel bridge, the reference channel bridge unbalance signal is detected as the voltage across a capacitor element 511. As discussed above, this capacitor must be large relative to other capacities of the bridge, and under this condition its magnitude serves as the span control for the reference channel bridge. Therefore, element 511 consists of a switch-selectable set of capacitors, the switch setting chosen depending on the largest capacitance that will be applied to the sensing element. This setting is generally made at the time of field calibration of the instrument.

A significant objective of the instrument design is to provide an instrument that is easy and convenient to use. The two-wire design represents one means towards this objective in that a two-wire instrument is easier to install than is a device of comparable function requiring separate power and signal lines. A further means for easy and convenient use is provided by the calibration switch function. The functions of the calibration mode switch 560 are indicated by the switch panel drawing of FIG. 6. On this switch, the calibration functions are arranged in a particular order so that proceeding from the initial position, which is labeled "Base 4 ma" in a clockwise order, initial calibration conditions are established that are required in subsequent calibration modes. This switch permits all of the instrument calibration conditions to be monitored by the meter installed in the output current loop (element 110 of FIG. 1) and thus, no special connections need be made or broken to field calibrate the instrument. Furthermore, the design of the switch function is such that when the instrument is operating in the normal and usual manner, no switch closure is needed to maintain the operating integrity of the system. Thus, the calibration switch reliability characteristic does not affect the operating reliability of the system, in accordance with an important object of the invention.

Instrument calibration begins with calibration switch 560 set to the "Base 4 ma" position. This calibration condition allows the output amplifier circuit to be zeroed to produce the desired 4 milliampere current output upon zero capacitance detected. The "Zero Ref" ("Reference") function connects the reference channel signal directly to the output amplifier, bypassing the divider function. In this condition, the reference channel bridge may be zeroed to produce a 4 milliampere output signal current. The "Zero Lev" ("Level") function, operating through the divider circuit, permits the level channel bridge to be zeroed by adjusting the bridge to produce a 4 milliampere output signal current. The "Span Ref" function again connects the reference channel signal to the output amplifier, whereupon the reference channel bridge span controls can be adjusted to select a span capacitor which produces a full scale output signal current. Finally, the "Span Lev" function operates the instrument in an essentially normal manner, allowing the level channel bridge span controls to be adjusted to select a full scale level channel span capacitor which produces a 20 milliampere output signal current. The Operate function is actually a default condition with regard to the calibration switch 560. That is, the calibration switch 560 has no effect on the operation of the instrument when operated in the normal manner.

Figure 6:
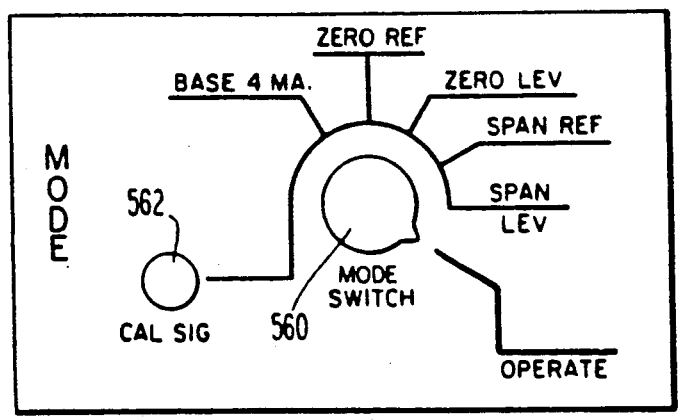
FIG. 6 shows how the various positions of a rotary calibration switch arranged so as to provide proper switching during calibration.

Associated with the rotary calibration switch 560 of FIG. 6 is the "Cal Sig" (for "Calibration Signal") pushbutton switch 562 whose function is to help ensure that the calibration switch 560 is finally left in its Operate position after the instrument technician has completed the calibration procedure. That is, unless the calibration switch 560 is turned to the "Operate" position, the "Cal Sig" pushbutton 562 when not depressed forces the output current signal to a level which is noticeably less than 4 milliamperes, thus forcing a remote indication that the system is not functioning properly. This forcing condition is disabled during calibration by depressing the Cal Sig pushbutton 562. (It is assumed that when the instrument is being calibrated, the appropriate capacitance input conditions are provided at the instrument sensor inputs, either by the establishment of operating conditions or by capacity simulation of the operating conditions.)

Figure 7:
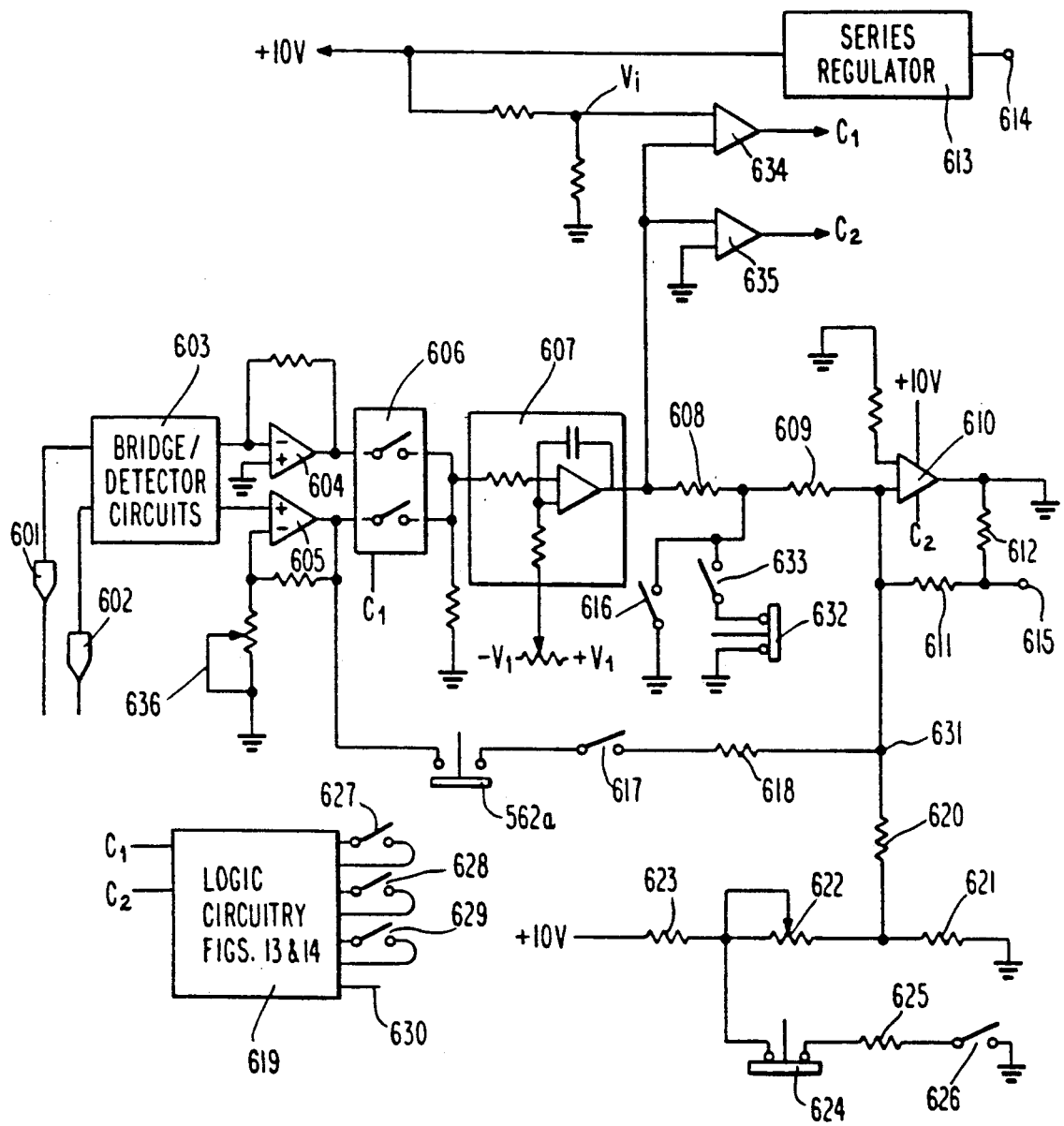
FIG. 7 shows circuitry providing certain of the calibration switch functions.

FIG. 7 provides a more detailed summary of the means of providing the calibration switch 560 and the Cal Sig switch 562 functions. Here, elements 601 and 602 represent the system sensors; element 603 represents the bridge and detector circuits discussed above.

Element 604 represents the level channel buffer amplifier, while element 605 is the reference channel buffer amplifier. Element 606 represents the electronic switch which connects either the reference or level signals from the buffer amplifiers 604 and 605 to the integrator circuit 607. The output of the integrator circuit 607 connects through resistors 608 and 609, to output amplifier 610. Resistor 612 is an output amplifier feedback resistor. Because of the negative feedback connection of the output amplifier 610, junction point 631 provides a summing junction for all of the functions which feed into the output amplifier. The instrument's combined signal and power terminals are shown at 614 and 615. Series regulator circuit 613 provides 10 volts to the circuits of the instrument. Element 619 represents low power, preferably CMOS, digital circuitry which controls the analog circuits described above. Logic circuitry 619 receives input signals from the calibration switch contacts 627-630 and logic signals $C_1$ and $C_2$ from high and low comparators 634 and 635, respectively, which monitor the output signal from integrator 607. That is, these comparators serve to define the time of integration T (FIG. 4). In the preferred embodiment, the high comparator 634 detects the occurrence of a level at or above 8 volts ($V_i$) at the output of integrator circuit 607, while the low comparator 635 detects the occurrence of an integrator output level at or below zero volts. The triangular waveform depicted in FIG. 4, thus defined by comparators 634 and 635, is supplied to logic circuitry 619, detailed in FIGS. 13 and 14, which determines the primary cycle timing for the system.

Connected to the summing junction 631 of the output amplifier 610 is a resistor 620 which transmits the zero balance base signal to the circuit. The zero balance base signal in turn is generated by a resistor network consisting of resistors 621 and 623 and variable resistor 622. Resistor 622 is adjusted to provide a 4 milliampere output current at output terminal 615 when the amplifier is receiving a zero input signal, in the "Base 4 ma" calibration mode. Connected to the higher voltage end of resistor 622 is a series network comprising resistor 625 and switches 624 and 626. Element 624 is a portion of the Cal Sig pushbutton switch 562 (FIG. 6), providing a normally closed contact. Switch 626 represents a portion of the multiple calibration switch 560 (FIG. 6). Switch 626 is closed for all conditions except the Operate condition. Thus, for all conditions except Operate, the resistor 625 represents an upset load on the zero setting network of the output amplifier. This upset forces the output amplifier to conduct a current which is about 3.7 milliamperes—a value noticeably below the standard "zero" signal current, i.e., 4 ma. During active calibration, the pushbutton switch 624 must therefore be activated, thereby temporarily removing the upset from the zeroing network. Thus, all calibration adjustments must be made while holding down the "Cal Sig" pushbutton switch 562 (624), while after release of the pushbutton at the end of calibration operations, the calibration switch 560 must be set to Operate as otherwise an error condition will be apparent on the indicator 110 (FIG. 1).

In the Base 4 ma calibration mode, a second calibration switch contact 616 is closed to force a zero level condition on the input of the amplifier 610. With the Cal Sig pushbutton switch 632 depressed, potentiometer 622 is then adjusted to produce an output current of exactly 4 milliamperes. The output amplifier in this mode, as in all modes, must receive a periodic "STORE" signal which causes it to update the charge on its storage capacitor. This signal is provided by the logic circuitry 619 which in turn is cycled by the high and low comparator signals $C_1$ and $C_2$. To maintain this timing, it is necessary that there always be a positive reference channel signal, which can be integrated by integrating network 607 (the absence of this signal is the equivalent of dividing by zero). In the "Base 4 ma" and "Zero Lev" calibration modes, an external non-zero channel signal cannot be guaranteed, so a pseudo-reference signal is generated which supplies a small current to the input of reference channel amplifier 605. This pseudo signal, initiated by a calibration switch contact 628, insures that the portion of the cycle for integrating the reference channel signal will always produce a negative ramp signal of some minimum slope sufficient to guarantee the integrity of the timing cycle.

In the "Zero Ref" calibration mode, the output of integrator 607 is isolated from the output amplifier by clamping the integrator output signal to circuit common through the action of calibration switch contact 616. At the same time, calibration switch contact 617 is closed, so that when the Cal Sig pushbutton 562 is depressed, closing contact 562a, the signal provided by reference channel amplifier 605 is conducted through resistor 618 to the output amplifier 610. Again, the output amplifier 610 must be periodically updated by recharging its storage capacitor (not shown). However, a pseudo reference channel signal cannot be used because now the zero balance signal provided by the reference channel bridge must pass through the system to provide an unadulterated output signal current. For this mode, amplifier storage signal $C_2$ is generated by logic circuitry 619 in response to calibration switch contact 629, without regard to the state of the integrator 607. In this particular mode, the storage signal does not need to be coordinated with the integrator output signal, so a free running signal developed by the control logic 619 is adequate.

The level channel bridge is zeroed in the "Zero Lev" calibration mode. In this mode, the system operates with calibration switch contact 633 closed. Since it would be likely at this point in the system calibration procedure for the reference sensor 602 to still be uncovered, a pseudoreference signal is again provided to maintain the integrity of the calibration timing cycle. The pseudo signal is provided here as described above for the "Base 4 ma" case. In this mode, the output amplifier 610 is forced to produce an output current below zero unless the Cal Sig pushbutton is depressed to open both contacts 632 and 624.

In the "Span Ref" calibration mode, the reference channel bridge circuit is adjusted by selecting the span detector and divider circuits. The preferred way for spanning the reference channel is to have the reference sensor covered with material exhibiting the highest dielectric constant that will occur in system use (generally, such a material is water). As was the case when zeroing the reference channel ("Zero Ref"), the integrator 607 is isolated from the output amplifier 610 through the closure of calibration switch contact 616 and the reference channel signal is carried through resistor 618 to the output amplifier summing junction 631. In this way, the bridge is spanned so that the maximum signal produced by the bridge in turn produces an output current near the full scale value. In design, the size of resistor 618 is adjusted so that the desired signal level at the output of amplifier 605 produces the desired current at terminal 615.

For the "Span Lev" calibration mode, the level channel is operated in an essentially normal manner to produce an output responsive to the selection of the level bridge span capacitor; however, switch 633 is again closed to force the use of the Cal Sig pushbutton to open contacts 632. The span capacitor is selected to produce a 20 milliampere output current when the sensor is covered to a level deemed to represent 100% full. The only distinction between the calibration modes "Span Lev" and the "operate" is that in the Span Lev mode, the Cal Sig pushbutton switch 562 must be depressed. At this point in the calibration procedure, the output current is adjusted precisely to exactly represent the input level condition by adjustment of the level channel span selector switches to provide the best available output current condition. The fine span level control potentiometer, 636, is then adjusted to trim the output current to the desired value.

In the Operate calibration switch position, calibration switch contact 626, which had previously been closed, is opened. This action removes the upset load from the output amplifier biasing circuit and correspondingly eliminates the effect of the Cal Sig switch. In this condition, the transmitter circuitry operates in the normal manner, and a zero level input condition will produce a 4 milliampere output current.

Those skilled in the art will recognize thus that the calibration operation involves a sequence of operations as follows: the instrument as a whole is set to produce the conventional 4 milliampere output current when no input is present ("Base 4 ma"). The reference channel, providing the signal indicative of the dielectric constant of the material to be measured to the division circuit, is adjusted to provide zero effect on the output of the instrument when the dielectric constant is minimized, i.e., when the material is air ("Zero Ref"). Next, the level channel signal is zeroed likewise, so that no change in the output signal is generated when no material is present—again, where the probe is in air ("Zero Lev"). The reference channel is then adjusted to provide a full scale variance in its signal upon exposure of the material with which the instrument is to be used (e.g., water) to the reference probe, to provide the maximum signal to the division circuit and accordingly to maximize the effective signal-to-noise ratio ("Span Ref"). Finally the level channel signal is caused to be maximized, e.g., by full immersion in water, and is adjusted to produce a full variance ("Span Lev"). In this way the ratio output to the indicator means is provided with maximum variation, as the output signal varies fully between 4 and 20 ma.

Figure 8A:
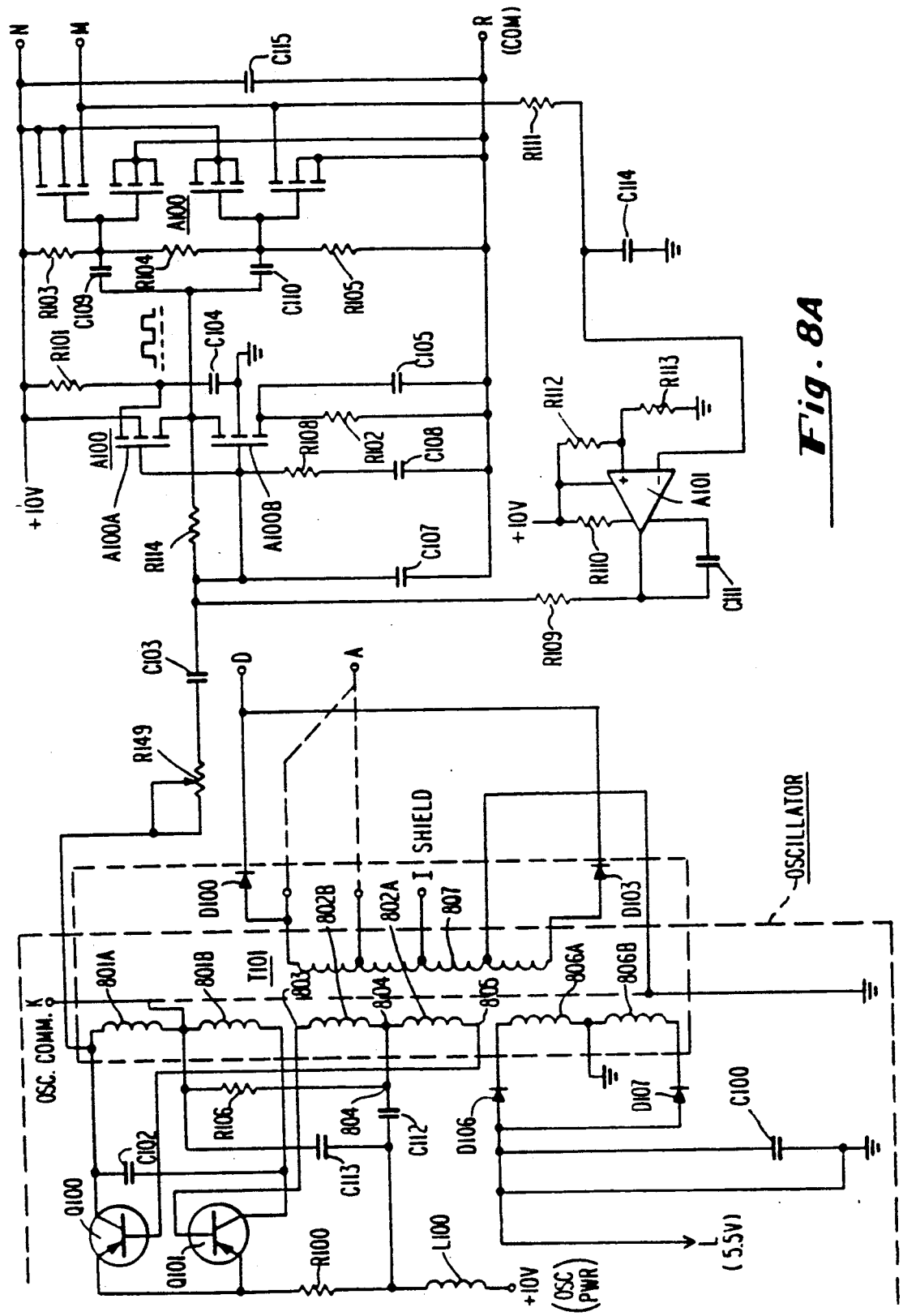
FIG. 8A shows a schematic diagram of the oscillator and chopper drive circuits.

FIG. 8A provides a detailed schematic diagram of the oscillator circuit and the chopper drive circuit. The two transistors Q100 and Q101 provide the only gain elements of the oscillator. The transformer T101 provides a number of distinct circuit functions; the input windings 801A and 801B couple transistors Q100 and Q101 respectively. The inductance seen across these two series connected windings acting with capacitor C102 forms a parallel resonant tank circuit which defines the basic frequency of operation of the circuit, typically 100 KHz. The small turn windings 802A and 802B couple some of the energy from the transformer into the bases of Q100 and Q101 to provide positive feedback circuits which produce the required oscillation. The center of the windings 802A and B connect to oscillator common bus through resistor R106. Because the emitters of Q100 and Q101 are connected to a voltage which is more positive than the voltage of the base circuits these PNP transistors in their quiescent state will turn ON. As the current in one transistor rises faster than the current in the other, a base drive is generated in the base windings which drives the most ON transistor still harder ON, while the relatively OFF transistor is driven even further OFF. This action occurs when both of the base windings are wound in the same direction. The turning ON of a transistor and OFF of the other is but a transient phenomenon, for soon after the transistor is turned ON, the current in the transformer primary winding ceases to increase and the base voltage drive is reduced. As the current amplitude falls, the base drive voltage reverses polarity and now the OFF transistor is driven ON while the ON transistor is driven OFF.

The base drive which had been generated also causes some base current to be drawn through R106 and C112 which in turn causes point 804 to become biased slightly positive. This bias action has a self-regulating effect in that it automatically increases with increasing base drive to result in a bias level which is just low enough to sustain the self-excited oscillation. The net effect of this mode of operation is that the two transistors Q100 and Q101 are biased in a class C manner, turning ON only at the peak of each excitation cycle. This mode of operation causes the transistors to conduct current for only a short portion of the time of each oscillator cycle which in turn produces an oscillator function with only a very small current drain—one of the objects of the invention. Resistor R100 limits the maximum current through an ON transistor and and also provides positive feedback coupling between transistors Q100 and Q101.

Even though the transistors Q100 and Q101 are ON for a small fraction of each oscillator cycle, the resultant oscillator signal is a continuous sinusoidal wave, due to the energy storage characteristic of the oscillator resonant circuit. The oscillator circuit provides two additional output functions. Windings 806A and 806B with diodes D106 and D107 provide a full wave rectifier circuit, generating a negative 5.5 volts which is used to power the digital control logic described in connection with FIG. 13. Capacitor C100 serves to filter this rectified voltage. Transformer winding 807 couples the oscillator excitation to the bridge circuits of FIG. 11, while winding tap I provides the shield reference excitation. Positive power for the transformer isolated error amplifier A (FIG. 9 bottom) is provided through the full wave rectifier action of diodes D100 and D103. The output winding 807, is referenced to Ground at tap connection E.

As described hereinabove, the AC signal seen across the selected SPAN capacitor of the bridge circuit (elements 511 or 505 of FIG. 5) represents the sensor signal which must be transformed into a corresponding low frequency signal voltage which will be applied to the divider circuit. This transformation involves AC signal amplification through error amplifiers A (FIG. 9) and B (FIG.1D) and then signal detection and rectification by the chopper circuits (FIG. 10) associated with the Reference and Level channels of the instrument. The chopper function provides a phase sensitive means for extracting the low frequency signals from the AC signal at the error amplifier B. The chopper detector means is similar to that taught by the commonly assigned patents referred to above; it is important to employ a phase sensitive detector that can distinguish between the real and reactive components of the amplifier signal, so that in the presence of a conductive component in the electrical impedance of the material within the vessel, the level determining capacitive component can still be detected and measured. The phase sensitive detector is implemented with a transistor chopper circuit driven by a square wave derived directly from the excitation signal applied to the bridge circuit.

Figure 10:
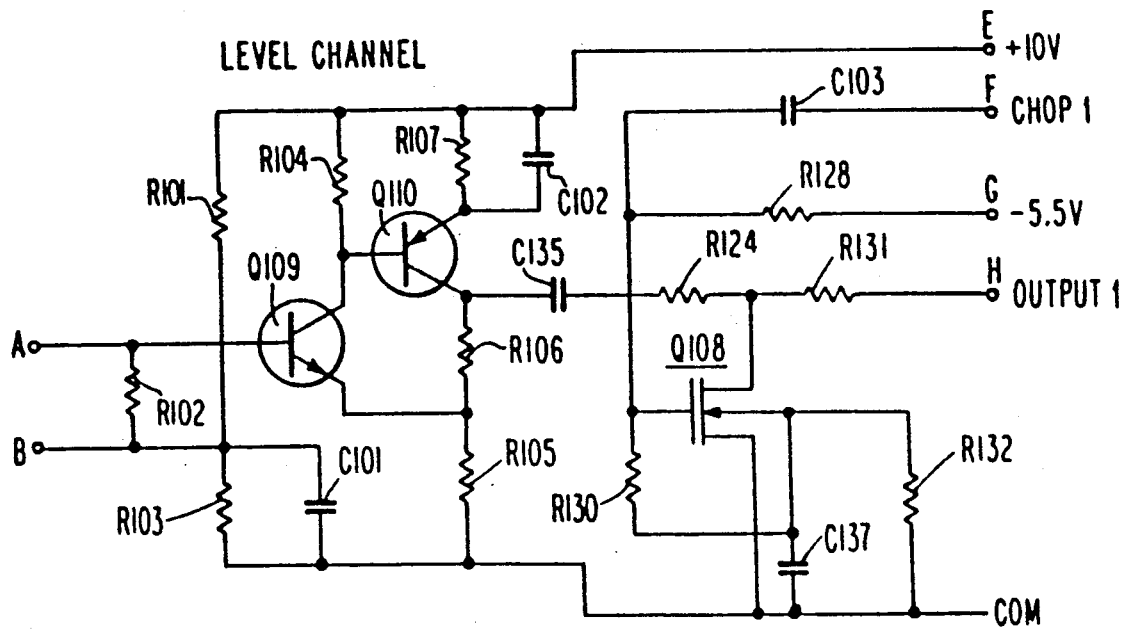
FIG. 10 shows a detailed schematic diagram of second dual error amplifiers.
Figure 10:
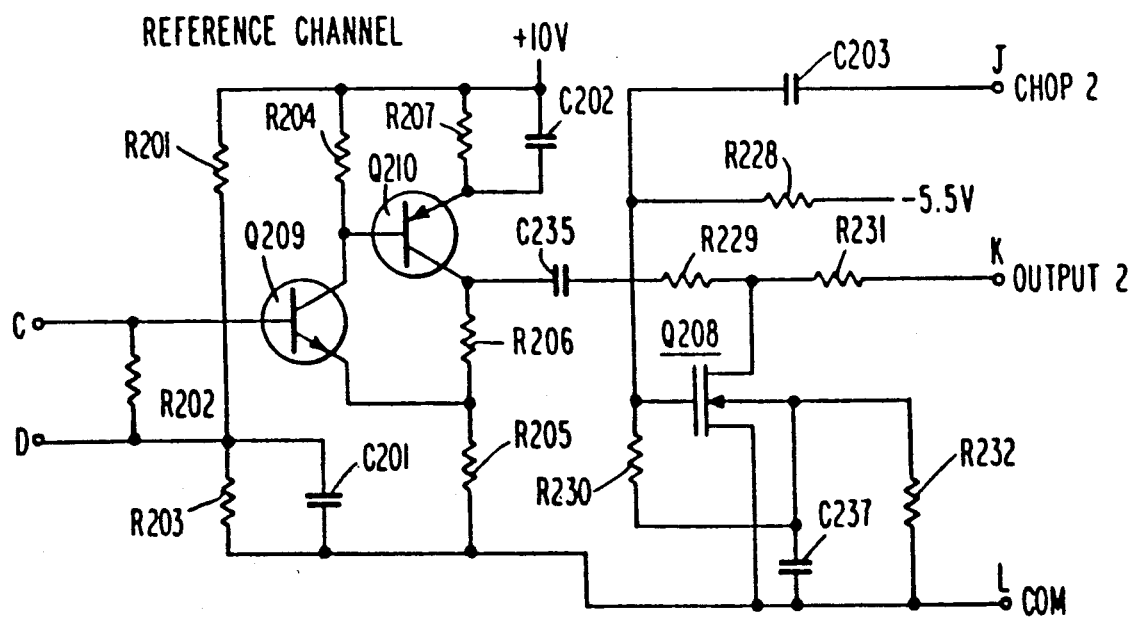
Figure 12:
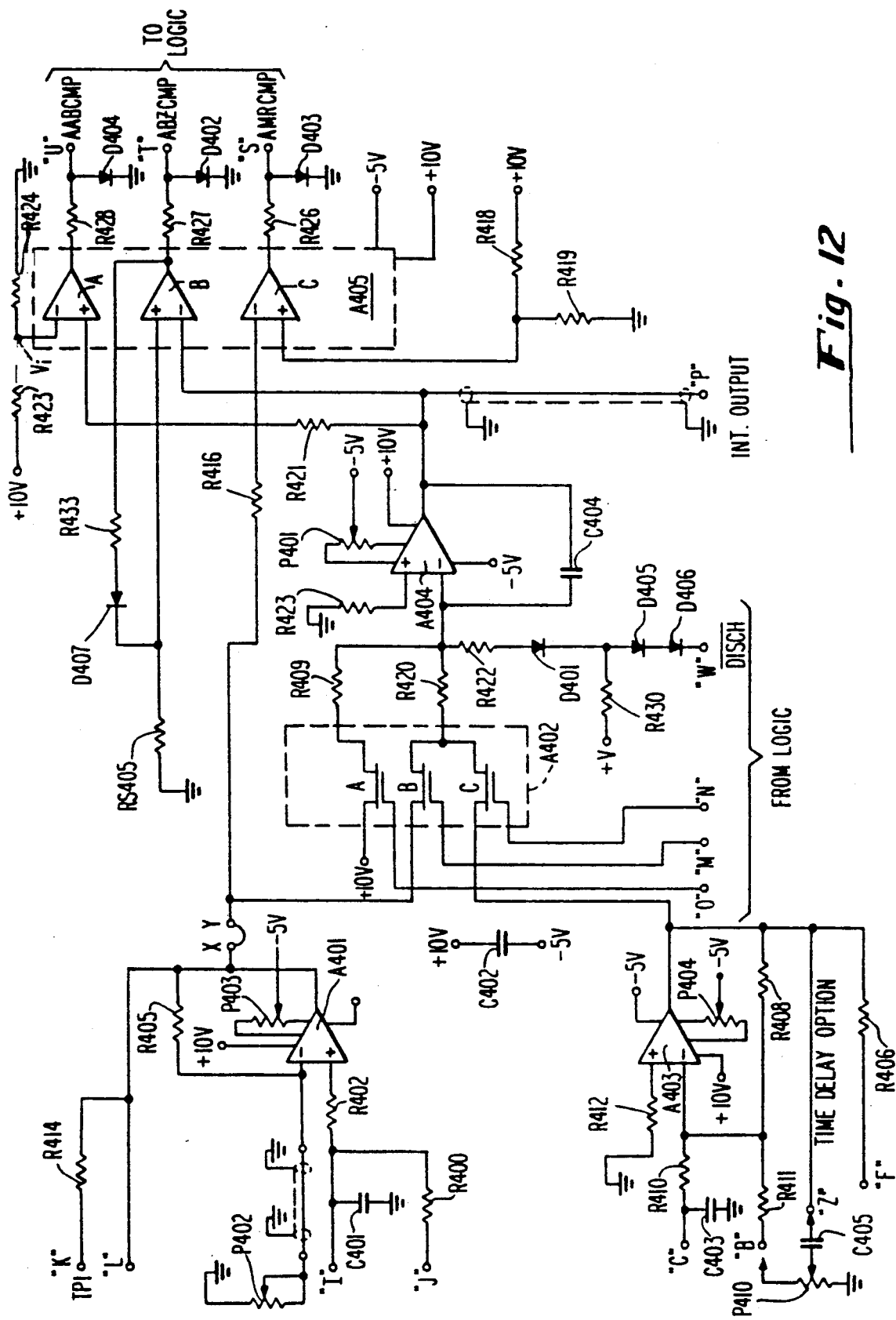
FIG. 12 shows detailed schematic drawings of the buffer amplifier and integrator circuits employed in the divider circuit.

The chopper circuit is seen in FIG. 10 as part of the Error Amplifier B circuit. The chopper transistors are shown as Q208 and Q108, for the reference and level amplifier circuits respectively. Referring to the reference amplifier circuit, the amplifier B output is applied to the chopper transistor Q208 through series connected components C235 and R229. The chopper transistor Q208 acts by alternately connecting the junction point of R229 and R231 to circuit common and then becoming an open circuit to allow the resistor junction point to return to its non-shorted condition. This chopping action is done in phase and frequency synchronization with the signal produced by the error amplifier, so that the output signal is effectively a "half wave" rectified signal. The integral of this signal corresponds to that portion of the amplifier signal which is directly proportional to the capacity at the sensor due to its being surrounded by material (other than air). The actual integration of this chopper signal is effected by applying this level channel signal to capacitor C403 seen in FIG. 12 (FIG. 12 shows the schematic diagram of the buffer and integrator/divider circuit). It should be understood that a corresponding action is effected for the level channel by chopper transistor Q108 (FIG. 10) which produces a signal which in turn is integrated by R131 and capacitor C401 (FIG. 12).

The drive signal for the chopper transistors is developed by the chopper drive circuitry of FIG. 8A. This function receives a phase corrected sinusoidal signal from the collector of oscillator transistor Q100. The sine wave is amplified through the action of the complementary transistors of A100. The amplification is large enough to cause clipping of the extremes of the sine wave signal, resulting in a phase synchronized, square wave output signal at terminal M. This is then the chopper drive signal which is connected to the circuit of FIG. 10 where it in turn is capacitively coupled (C203 and C103) to the chopper transistors described hereinabove.

The chopper drive circuit input signal is phase adjusted by components R149, C103, and C107. Potentiometer R149 provides the direct means for manually setting the phase of the chopper drive signal to the desired degree (generally zero degrees) relative to the signal provided by the Error Amplifier B circuits.

Amplifier A101 of FIG. 8A produces a bias correction signal whose function is to adjust the DC bias level on the chopper drive circuit input so that the chopper drive signal maintains a constant ON/OFF ratio of approximately 50%. The circuit common based chopper drive signal M connects to amplifier A101 through the low pass filter network comprising R111 and C114. This low pass filter produces a DC signal which is a measure of the ON/OFF ratio of the chopper drive signal. This filtered signal is compared with a reference voltage level produced by the resistor attenuator of R112 and R113. The difference between the filtered signal and the reference level is amplified by A01 to produce the bias signal on filter capacitor C111 and applied to the input transistors A100A of the chopper drive circuit through resistor R109. The polarity of the signal connections on amplifier A101 is such that a signal which is more negative than the reference level produces a relatively positive bias signal, which acts on the chopper drive circuit to increase the ON time of the drive signal which in turn makes the filtered level applied to amplifier A101 be more positive.

Figure 9:
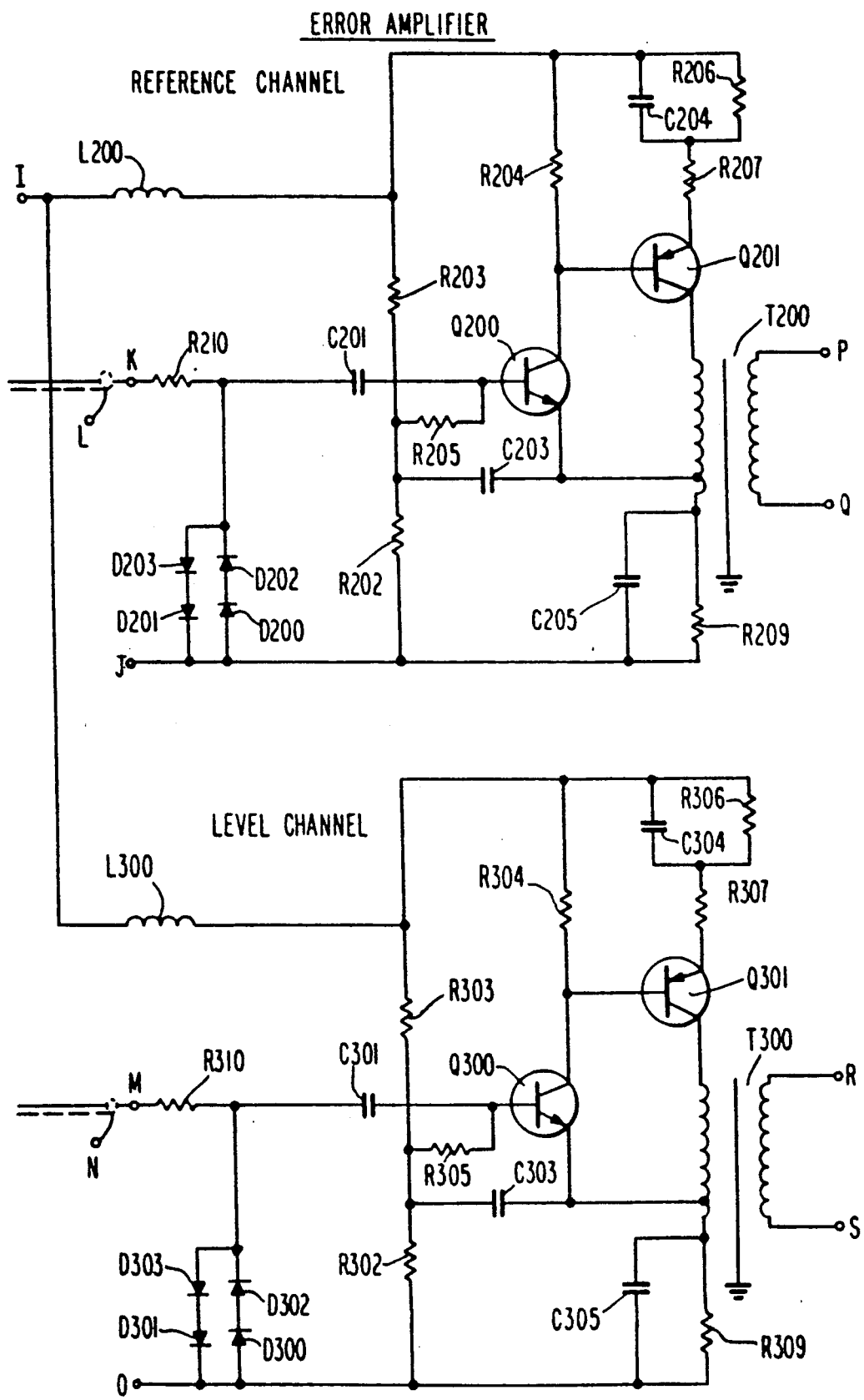
FIG. 9 shows a detailed schematic diagram of first, low powered dual error amplifiers.

FIG. 9 shows a pair of identical, error amplifiers A, which receive the signal across the SPAN capacitors and produce a bridge unbalance signals which become referenced to circuit common. The operation of the level channel amplifier will be discussed; operation of the corresponding reference channel amplifier is the same. The design of each Error Amplifier A is similar to that used in the capacitive level sensing transmitter described by the commonly assigned patents referred to above. Important characteristics of the amplifiers of FIG. 9 include stable gain, very high input impedance, low current consumption, operation at the excitation frequency of 100 KHz, and an output signal which provides high voltage isolation between the amplifier and the remainder of the transmitter circuitry. The circuit design achieves a high input impedance and stable gain through the use of negative signal feedback. The feedback signal is derived from a winding tap on the primary of transformer T300. The turns ratio on the primary of T300 provides a stable mechanism for specifying the voltage gain of the circuit. The negative feedback signal, by virtue of the substantial open loop gain of the amplifier provides a signal level which is essentially identical to the input signal. Thus, applying this signal to the emitter of input transistor Q300 and through capacitor C303 to the input resistor F305 results in a very high input impedance circuit.

The Sensor and Span capacitor junctions seen in FIG. 5 at point 524 for the Reference Channel and point 523 for the Level Channel connect respectively to input points K and M of the Error Amplifier A circuits of FIG. 9. These perform substantially a preamplification function. The Error Amplifier common, point J in FIG. 9, connects to the shield reference which is seen as point 517 in FIG. 5. Thus, each Error A amplifier is effectively connected across its corresponding span capacitor and the output signal which the Error Amplifier produces is directly proportional to the voltage developed across the corresponding Span capacitor. These amplifiers also have the property of operating with their circuit common reference point at the AC potential of the AC shield voltage. By operating in this manner, there are fewer deleterious effects due to stray capacity between amplifier circuit elements and chassis ground. The Error A amplifiers are moreover shielded by surrounding the circuit on all sides with partitions which are driven at the shield potential. This shielding further minimizes the effects of stray capacity to ground.

The actual circuit elements of the Error A amplifiers are shown in FIG. 9. Spark protection is provided on the amplifier input by Resistor R310 and diodes D300, D301, D302, and D303. These sparks may arise from motion among the particles of material which is being measured. Any high voltage spark potential which may contact the system sensing element is shunted to circuit common by the diodes. Series pairs of diodes are connected in parallel opposition to provide a low impedance path for spark transients of either positive or negative polarity. Serial pairs of diodes are used in this specific design to minimize the appearance of any shunt capacity across the diode appearing at the amplifier input.

For the circuit of FIG. 9, the input signal arriving at point M is capacitively coupled to the amplifier through capacitor C301. Input bias is provided by resistors R302 and R303. Input NPN transistor Q300 directly couples to complementary PNP transistor Q301. Q301 is biased with the provision of the parallel combination of C304 and R306 in the emitter circuit series connected to emitter resistor R307. R307 provides a little negative feedback to transistor Q301 but more significantly increases its input impedance to provide a more efficient power transfer from Q300. Transformer T300 is series connected to the collector of Q301. Series connected between the transformer primary winding and circuit common is a parallel RC combination of R309 and C305. This combination develops a bias voltage which permits the input transistor Q300 to operate at an appropriate input signal level and also provides stabilizing DC feedback. Inductor L300 receives a full wave rectified power signal from the oscillator transformer secondary winding at terminal I. This signal is smoothed by the AC impedance of the inductance.

The output winding of T300 (terminals R & S) permits the output signal to be referenced to an arbitrary circuit common point and in particular permits the signal to be separated from the shield voltage signal. As indicated previously, the output winding of the transformer also permits high voltage isolation between the intrinsically safe sensor circuitry and the remaining circuitry of the instrument. As noted, the upper portion of FIG. 9 shows a substantially identical reference channel amplifier and notes the appropriate points for connection to the rest of the circuit.

Figure 8B:
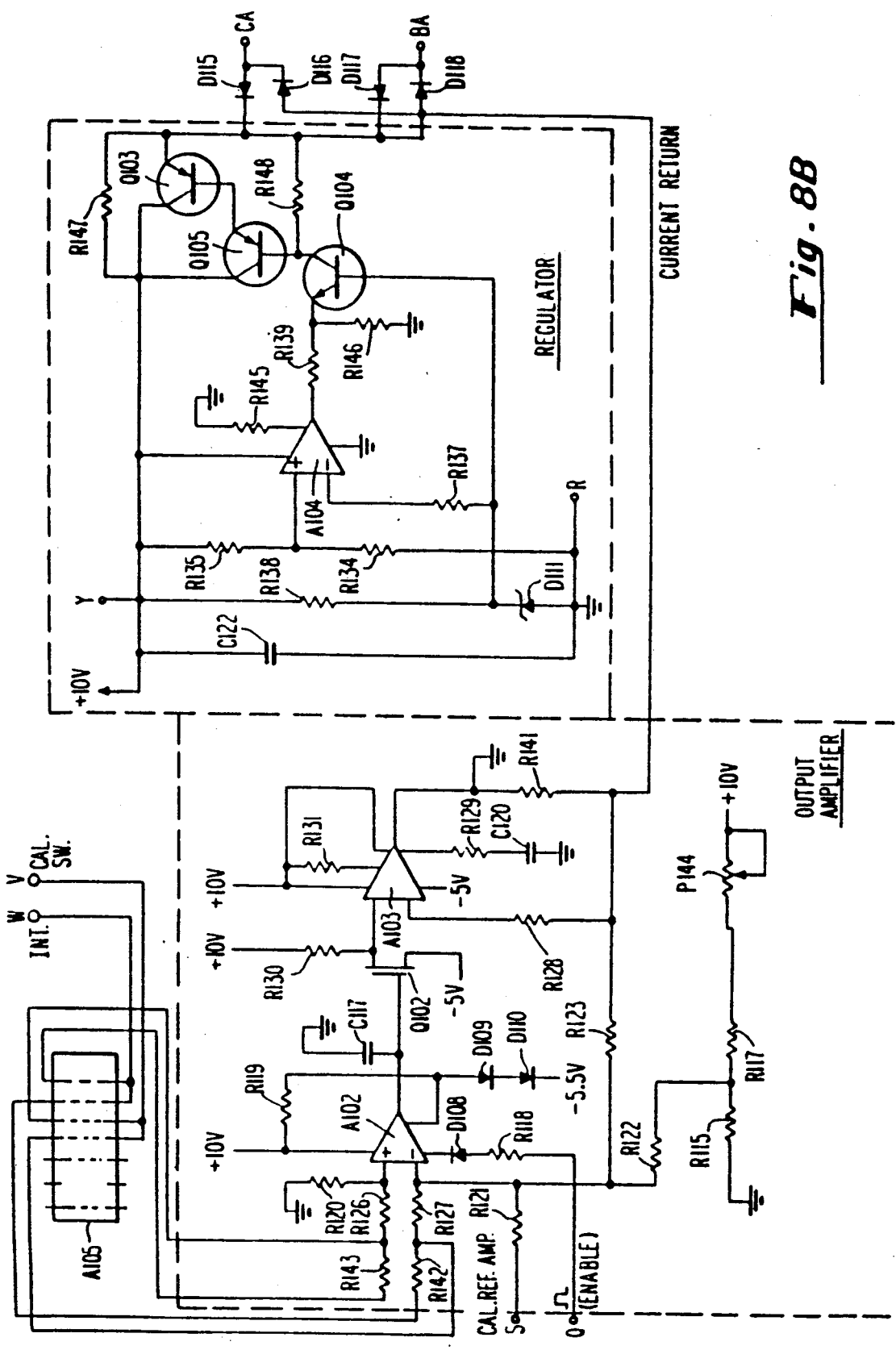
FIG. 8B shows a schematic diagram of the output amplifier and regulator circuitry.

FIG. 8B shows a detailed implementation of the output amplifier and voltage regulator functions. Thus, FIG. 8B shows the output amplifier of FIG. 2 in much greater detail. In FIG. 8B the input amplifier of the output amplifier function is shown as A102. This amplifier is turned on and off by the action of enable signal Q applied through R118 and D108. The divider circuit provides an input W to the amplifier through series connected resistor R142 and R127. The junction of R127 and R142 is a point at which the CAL switch of FIG. 6, can short the input to circuit common and thereby isolate the amplifier from the divider circuit, without requiring an unreliable series switch connection. When the divider signal is thus shorted to ground, the reference channel may be connected by the CAL switch to the amplifier at terminal S permitting the reference channel bridge to be calibrated by referring to the instrument output current. A bias current to amplifier A102 is provided by a resistor network comprising R122, R115, R117 and P144. There is no particular concern over connecting the reference channel signal to S with a series CAL switch contact because this connection is not used during normal instrument operation.

The negative voltage power connection for amplifier circuit A102 is made to −-5.5 volts through series connected diodes D109 and D110; a minimal current is always available to these diodes through resistor R119. The effect of this network is to raise the voltage of the amplifier's negative supply about 1.2 volts above −5.5.

Amplifier A101 is made operational by a positive current through R118 and series connected diode D108. The amplifier A102 is turned OFF during the HOLD mode by removing the current through R118. This condition is assured by driving Q to −5.5 volts. Since the negative amplifier supply is about −4.3 volts, a reverse bias is established across low leakage diode D108 and the zero current, disabled condition is assured for Amplifier A102. The output of A102 is connected to storage capacitor C117 and high impedance field effect transistor Q102. Thus, when A102 is disabled C117 is only connected to very high impedance terminals and its charge will remain essentially undisturbed. The source terminal of Q102 connects to resistor R103 and the input of A103. Whatever voltage appears at the input of A103 is reflected as an output current from the instrument. Amplifier A103 is a low power device whose quiescent current drain is controlled by Resistor R131. Network R129 and C102 provides frequency compensation to stabilize the circuit of A103.

Resistor R141 is the current sensing resistor which forms part of the output amplifier feedback network. Resistor R128 connects the inverting input of A103 to its output making the amplifier have a voltage follower action.

Resistor R123 provides the output amplifier with overall feedback which is active when Al02 is enabled. Resistor R141 has one end connected to circuit common and the other end connected to one current signal output terminal of the instrument. Thus, all current drawn by the instrument passes through R141. Since amplifier A102 is referenced to circuit common by resistor R120, the voltage drop across sensing resistor R141 provides an appropriate feedback voltage for the output current amplifier. For normal operation resistors R143 and R126 are disconnected by strapping applied to header A105. The connections are changed when using the inverted mode of operation to change the mode of operation of the amplifier. When inverted operation is desired there results a high output current (20 ma) when the bridge is balanced and a low output current (4 ma) when there is a maximum sensor capacity applied to the bridge. This mode of operation is effected by biasing the output amplifier to the high current condition. The phase of the chopper drive is also changed to produce a increasing negative, rather than positive, signal with increasing sensor capacity. As noted, the amplifier connections are changed by changing the strapping on the terminals of header element A105. In the inverted condition, Resistors R142 and R127 become open circuited and the integrator and CAL switch connections W and V, are made to R143 and R126.

The regulator circuit of FIG. 8B provides a series regulator element Q103 controlled by measuring the voltage difference between the attenuated 10 volt level and a stable reference element D111. The circuitry is unique in that it consumes very little current while regulating the voltage within ±0.01 volts over a temperature range of −40° to +70° C. Diode D111 provides a very stable reference voltage (6.2 volts) while requiring a current less than 100 microamperes. Voltage divider network R135, R134 attenuates the 10 volt voltage output to produce a signal input to amplifier A104 that is equal to the reference diode voltage. When the output voltage (10 volt) varies, the difference signal into A102 varies so as to cause Q103 to change its conductance in a manner which again establishes the 10 volt regulated signal, as follows. The output voltage from A104 drives the emitter of transistor Q104. Q104 in turn drives the base of Q105. Transistor Q105 and Q103 are connected in a Darlington circuit configuration. Driving the base of Q105 toward circuit common increases the current through Q103 and consequently the output voltage signal at terminal Y. Transistors Q104, Q105, and Q103 are selected to provide effective current gain when operating at very low current levels. Resistor R147 shunting Q103 is provided to provide a minimal amount of current to the regulator circuit to assure proper regulator start-up upon application of power to the instrument. Diode network D115, D116, D117, and D118 is provided to permit the instrument user to connect his power loop to terminals CA and BA without regard to power supply polarity. The diode network automatically connects the negative input to the negative side of the circuit and the positive input to the collector of Q103.

FIG. 10 shows the dual error amplifiers B. These are simple low power circuits which receive their inputs from the error amplifier A transformer outputs and which in turn capacitively couple their output signals to their respective chopper circuits. The reference chopper transistor is Q208 and the level chopper Q108. The use of the synchronous chopper circuits permits the reactive portion of the sensor signal to be extracted from the total received signal. The chopper circuits are driven in parallel through input connections Chop 1 and Chop 2 from the chopper drive circuit of FIG. BA.

FIG. 10 shows the schematic diagram for the two channels of amplification provided by the Error Amp B circuits as well as the chopper circuits described hereinabove. The two Error Amp B channels are the same in all respects. One channel receives level channel signals while the other receives reference channel signals. The description following centers on the reference channel amplifier; however, the remarks correspond to the level channel amplifier as well.

Terminals C and D receive channel signal information which has been pre-amplified by the A Error Amplifier. These signals are received from the floating output winding of the A Error Amplifier. This signal is AC referenced to circuit common by capacitor C201. Resistor network R201 and R203 establishes a DC bias input level for the amplifier. The input impedance for the amplifier is established by resistor R202. Voltage gain is provided by the complementary transistor couplet of Q209 and Q210. Transistor Q210 provides the amplifier output signal at its collector and also provides through collector attenuator network R206 and R205, a negative feedback signal to the emitter of Q209. This feedback signal has the dual purposes of stabilizing the gain of the amplifier and also raising the amplifier input impedance. In a preferred embodiment, the amplifier is designed to have a gain of 4; accordingly, $\frac{1}{4}$ of the output signal is fed back to the input transistor Q209. R204 is the collector resistor of Q209, and R207 and C202 provide DC emitter biasing for transistor Q210.

The amplifier output signal is AC coupled by C235 to chopper resistor R229. The amplifier gate and substrate are biased by resistor network R228, R230, R232, and C237.

FIG. 11 shows the entire bridge circuit for the reference and level channels combined. The circuitry is seen to be very similar to that shown in FIG. 5. In FIG. 11 the level channel span switch 801 is shown as implemented with a two-digit binary coded switch which opens or closes the span capacitor connections to the shield reference bus. The least significant digit of the switch is binary coded and with 4 binary weighted capacitors (or pairs of capacitors, to achieve intermediate values) provides 16 different span conditions. The most significant digit of the switch has less costly binary coded decimal (BCD) form and provides 10 different span conditions with 4 binary weighted capacitors (or pairs of capacitors, to achieve intermediate values). The span switch 801 thus provides, with 8 equivalent capacitors, 160 individual span steps distributed substantially uniformly over the span range.

The reference channel span switch 802 is implemented with two (concentric) rotary switches 803 and 804 each housing 9 active positions, and utilizing 18 equivalent capacitors. This arrangement provides 81 individual span steps. The rotary switch design for the reference channel is employed to take advantage of the reduced cost of the rotary (dual) switch 802 relative to the two-digit thumbwheel switch, used for level span switch 801; the minimal cost of the small capacity capacitors used by the reference span switch design and the reduced total resolution requirement could be accommodated by either one of the measuring channels. Reference step zero and level step zero switches 806 and 808 are also shown in FIG. 11. These are used for setting the zero values at calibration.

The values of the individual capacitances making up the bridge circuits shown in FIG. 11 are listed in Table I, below. Where plural capacitances are put in the circuit by a single switch, the individual values and their total is shown.

TABLE I

| Component | Capacitance (pfd) | Step | Step Capacitance |
|---|---|---|---|
| REF. SPAN (FINE) - 803 | | | |
| C1 | 220 | 1 | 220 |
| C2 | 330 | 2 | 330 |
| C3 | 470 | 3 | 470 |
| C4 | 470 | | |
| C5 | 120 | 4 | 590 |
| C6 | 390 | | |
| C7 | 330 | 5 | 720 |
| C8 | 470 | | |
| C9 | 390 | 6 | 860 |
| C10 | 1000 | | 1000 |
| C11 | 1100 | 7 | |
| C12 | 180 | 8 | 1280 |
| C13 | 1300 | | |
| C14 | 180 | 9 | 1480 |
| C15 | 100 | 0 | 100 |
| REF SPAN (COARSE) - 804 | | | |
| C18 | 1000 | 1 | 1000 |
| C19 | 2200 | 2 | 2200 |
| C20 | 3300 | 3 | 3300 |
| C24 | 4700 | 4 | 4700 |
| C22 | 1200 | | |
| C23 | 4700 | 5 | 5900 |
| C25 | 4700 | | |
| C26 | 2200 | 6 | 6900 |
| C27 | 3300 | | |
| C28 | 4700 | 7 | 8000 |
| C30 | 4700 | | |
| C31 | 4700 | 8 | 9400 |
| C32 | 4700 | | |
| C33 | 4700 | | |
| C34 | 1200 | 9 | 10600 |
| REF. STEP ZERO - 806 | | | |
| C401 | 4700 | 0 | 4700 |
| C402 | 2200 | 1 | 2200 |
| C403 | 1000 | 2 | 1000 |
| C405 | 470 | | |
| C406 | 330 | 3 | 800 |
| C407 | 470 | 4 | 470 |
| C408 | 220 | | |
| C409 | 100 | 5 | 320 |

TABLE I-continued

| Component | Capacitance (pfd) | Step | Step Capacitance |
|---|---|---|---|
| C410 | 220 | 6 | 220 |
| C411 | 100 | 7 | 100 |
| C412 | 39 | 8 | 39 |
| LEVEL STEP ZERO - 808 | | | |
| C309 | 22 | 0 | 22 |
| C308 | 39 | 1 | 39 |
| C307 | 56 | 1 | 56 |
| C306 | 68 | 3 | 68 |
| C305 | 82 | 4 | 82 |
| C304 | 100 | 5 | 100 |
| C303 | 120 | 6 | 120 |
| C302 | 120 | | |
| C301 | 22 | 7 | 142 |
| C300 | 120 | | |
| C299 | 39 | 8 | 159 |
| C229 | 180 | 9 | 180 |
| LEVEL SPAN SWITCH - 801 | | | |
| LSD: C337 | .0033 (mfd) | | |
| C338 | .0047 | 1 | 0.0080 |
| C339 | .015 | 2 | 0.015 |
| C340 | .015 | | |
| C341 | .015 | 4 | 0.030 |
| C342 | .015 | | |
| C343 | .047 | 8 | 0.062 |
| MSD: C344 | .15 | 1 | 0.15 |
| C345 | .27 | 2 | 0.27 |
| C346 | .15 | | |
| C347 | .47 | 4 | 0.62 |
| C348 | 1.5 | 8 | 1.5 |

Those skilled in the art will readily recognize how choice of one value from each of the several switched capacitances available will, in combination with the trim capacitors shown, permit zeroing and full-scale indicator movement for both reference and level channels, substantially without regard to the actual dielectric constant of the material.

The component values called for require the difference in design between the step zero switches of the level and reference channels, 808 and 806, respectively. The very small zero capacities accommodated by the reference channel step zero function dictate the more involved design which is illustrated.

FIG. 12 shows a detailed schematic diagram of the buffer amplifier and integrator circuits employed in implementing the division function. In this circuit op. amp. A404 is the integrating amplifier with integrating (feedback) capacitor C404 and integrating resistor R420. The analog switch A402 sequentially applies the reference and level channel signals to the integrator A404.

Element A405 provides 3 independent comparator circuits A405A-C; the A and B elements connect to the output of integrator A404 circuit, and provide signals indicative of its operation. Comparator A405A has its negative input connected to a voltage reference point at 8 volts provided by a resistor divider network comprising R423 and R424. This comparator A405A thus switches from a low to high state when the output of integrator A404 reaches the 8-volt reference level $V_i$, thereby signaling the control logic that the integrator A404 has been reset.

The signals generated by the chopper circuits of FIG. 10 connect to integrating capacitors C401 and C403 of FIG. 12. The reference channel signal connects to C401 at terminal I and the level channel signal connects C403 at C. Operational amplifier A401 provides a non-inverting gain for the positive reference channel signal using feedback resistor R405 and gain setting resistor P402. The amplifier is zeroed with potentiometer P403. Resistor R400 connects an auxiliary signal from the calibration switch into the reference channel which is used to assure a non-zero reference channel signal level during portions of the calibration procedure. The amplifier output connects through jumper wire XY to the integrator switch A402 and to the comparator C of A405. The jumper XY is used to provide a means of providing a modified reference signal to the divider function when the geometry compensation function is used with the measurement system.

Capacitor C403 integrates the level channel chopper signal. Operational amplifier A403 provides an inverting amplifier function for the positive level channel signal. The amplifier output connects to the analog switch A402 associated with the divider function. Potentiometer P404 provides a means for adjustment of the zero of the A403 amplifier.

The analog switch A402 provides the means of switching the required analog voltages to the integrator. As described earlier, the reference channel and level channel are alternately switched to the integrator in the course of division. One switch channel is used in the course of normal operation to provide a synthetic signal through R409 when the reference channel signal falls below a preset threshold detected by comparator C of A405.

Operational amplifier A404 provides the integrator for the division function. Capacitive feedback is provided by C404. The integrator is zeroed with potentiometer P401. The integrator is referenced to circuit common and resistors R409, R420 and R422 all connect with feedback capacitor C404 and the integrator summing junction. The reference channel signal connects to integrating resistor R420 through switch A402B while the level signal connects to integrating resistor R420 through switch A402C. These two switches are controlled by switching signals provided at terminals M and N respectively. The integrator is reset to its S volt reference level $V_i$ by the discharge signal connected to terminal W. The negative discharge signal passes through diodes D401, D405 and D406 to apply a negative logic level signal to R422. This negative signal then forces the integrator output in a positive direction. The reset signal is removed when it switches to circuit common and low leakage diode D401 becomes reverse biased from the application of a positive voltage through R430 to the cathode of D104. The provision of the two series diodes D405 and D406 assures that the cathode of D401 can become slightly positive and thus be reverse biased.

The output of the integrator A404 connects to the input of the output amplifier of FIG. 8B through terminal P and also connects to comparators A405A and A405B. Comparator A405A has its reference input connected to network R423, R424 which provides the reference voltage level $V_i$ of 8 volts for the divider function. Thus, when the integrator output exceeds the reference voltage $V_i$ the output AABCMP of comparator A switches from a −5.5 volt level to a positive level. The resistor-diode clamp network of R428 and D404 limit the positive excursion of the comparator output signal to 0 volts (i.e., circuit common) and an appropriate logic control circuit input signal is thus generated. The integrator output signal is also connected to comparator A405B which is referenced to circuit common through resistor RS405. When the integrator output falls below zero volts, the output ABZCMP of comparator A405B becomes positive. Its signal is also constrained by R427 and D402 to switch between −5.5 and zero. Comparator A405B has a positive feedback network comprised of R433 and D407 which connects from its output to its non-inverting input. This feedback sharpens the comparator transition and also provides a hysteresis characteristic which insures that it switches from high to low at a slightly different level from that causing low to high switching. These positive feedback characteristics are desirable because the rate of change of the integrator signal may be quite slow as it approaches the zero level due to a small reference channel signal level.

Comparator A405C is referenced by resistor network R418 and R419 to a voltage level two tenths of a volt above circuit common. This comparator switches when the reference channel signal level becomes less than this and thereby signals the control logic via AMRCMP to provide a synthetic signal to the integrator through R409 in order to preserve the system timing. The assumption is made that any time that the reference channel signal becomes this small, it is due to the sensor probe becoming uncovered and that therefore the level channel is at zero. Hence, it does not matter for this case what the reference channel signal level is, as long as it is sufficiently greater than zero. A signal is provided to the control logic which indicates that the reference channel signal can no longer be used, and that a substitute signal must be used. This substitute signal is generated by using +10 volts applied to the integrator A404 through R409 in place of the reference channel signal. A synthetic signal is thus provided for calibration purposes.

For cases where the level channel signal varies at a relatively high frequency due to wave action in the material being measured, the signal may be smoothed by the feedback action of the large capacitor C405 and potentiometer P410. The potentiometer provides a means for adjusting the amount of smoothness that will be employed.

Figure 13:
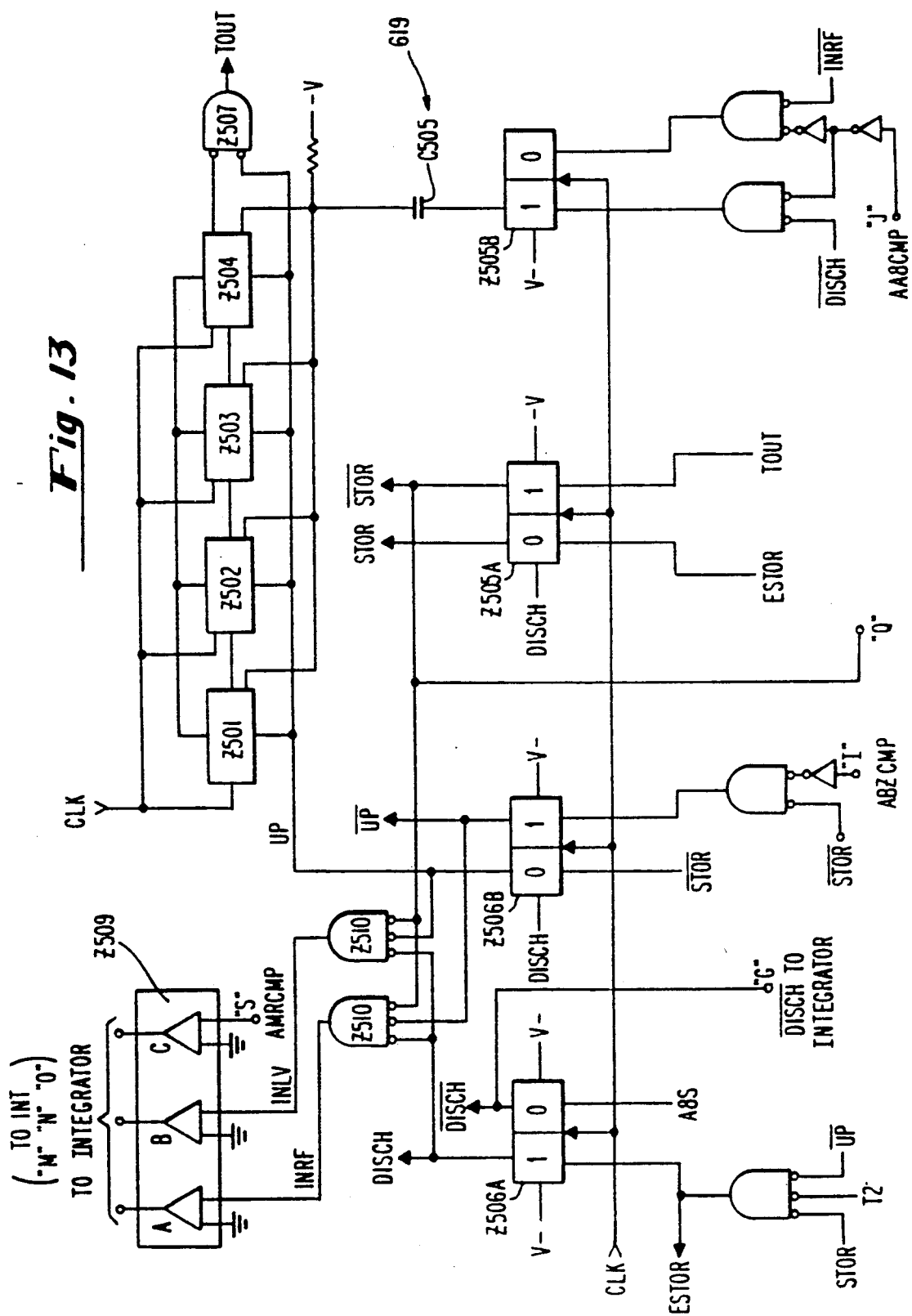
FIG. 13 shows the design of the control logic circuitry.

FIG. 13 shows a detailed logic design schematic for the control circuit which activates the integrator buffer circuit of FIG. 12 to cause it to perform the division function. This logic is implemented with CMOS type logic to permit it to function at extremely low power levels. The positive logic power connection for this function operates at circuit common and the negative power connection operates at minus 5.5 volts as provided by diodes D106 and D107 shown in FIG. 8A. The logic circuitry of FIG. 13 operates in a mode that is synchronous with a clock signal developed from the chopper drive signal. The clock for this circuit then runs at a frequency of about 100 kHz. Components Z501, Z502, Z503 and Z504 are each synchronous 4-bit binary counter circuits. Serially linked as in FIG. 13, they form a 16-bit up/down counter. In a preferred embodiment, RCA CD4516 units may be used; these are provided with a control point which determines whether the circuit operates as an UP counter (control high), or as a DOWN counter (control low). The flip-flop circuits Z505, Z506, which may be RCA CD4027 units, act as synchronous temporary binary storage elements which determine which mode the control logic is currently activating. That is, the flip-flop states are decoded to determine control signals such as integrate reference, integrate level, store level, or discharge (reset) integrator.

The action of the control logic of FIG. 13 is best understood by simultaneous reference to the timing diagram of FIG. 14. In this diagram, each of the significant signals is referenced by a signal name and a sequential line number. Line 11 provides a convenient point of reference by showing the representative signal waveform output by the integrator circuit of FIG. 12. It is convenient to study the control action by starting at the beginning of a divider cycle when the integrator circuit is being reset, i.e., discharged to its voltage reference level, $V_i$. The reset action is initiated by the signal $\overline{DISCH}$ shown on line 1. As shown on line 11, the application of the negative $\overline{DISCH}$ signal to the integrator circuit forces the integrator output positive. This action continues until the integrator causes the reference comparator A405A to switch, producing the signal AA8CMP ("analog above 8 volts at the comparator"—see FIG. 12). This signal causes flipflops Z505B and Z506A to switch. This action causes the counters Z501 through Z504 all to clear to zero through the transient activation of their control ports through 6505, and it also causes the discharge signal $\overline{DISCH}$ to be removed. The removal of the discharge signal in turn allows the integrate reference level INRF (Line 3) to be initiated, which upon application to element A of Z509 produces a switch control signal. This signal, connected to analog switch A402 (FIG. 12) applies the reference channel signal to the input of integrator A404. As shown in FIG. 14, lines 3 and 11, this action then initiates the negative ramp of the integrator waveform. As the integrator output moves negative with respect to the voltage reference level $V_i$ the reference comparator signal AA8CMP, falls to its Low state. With this input change flip-flop Z505B changes state and the Clear signal is removed from the 16-bit counter group Z501-Z504. The removal of the clear signal allows the counter Z501-Z504 to commence counting clock pulses up from its zero state, thus measuring the time of integration. Note that this count commences at the time when the negative ramp of the integrator just leaves the voltage reference level $V_i$(8 volts) —that is, $V_i$ provides the initial condition of integration.

The integrator negative ramp continues until its output reaches zero, when the zero comparator A405B generates the ABZCMP signal (analog below zero). This signal causes flip-flop Z506B to switch, changing the counter UP/DOWN control signal from its UP state to its DOWN state (line 5 of FIG. 14). At the same time, the change in flip-flop Z506B also inhibits the INRF (integrate reference) signal and enables the INLV (integrate level) signal. The INLV signal is applied to element B of Z509,.which then closes the analog switch circuit A402C (FIG. 12) which causes the negative level channel signal produced by level buffer amplifier A403 to be applied to the integrator A404 through resistor R420 (FIG. 12). This negative signal now causes the integrator A404 to begin producing a positive ramp signal which starts from the zero voltage level. Note that during the course of this positive ramp signal, the 16-bit counter Z501-Z504 is now counting down from the value it obtained from the previous UP counting period. This counting action can be inferred from the $\overline{UP}$ signal shown on line 5 of FIG. 14.

The positive ramp signal, integrating the level channel signal (ref. FIG. 14, line 11) will continue until the 16-bit counter Z501-Z504 has counted down to a value of zero; that is, for a period T equal to that during which it counted up. This condition is indicated by the generation of a pulse signal TOUT (ref. FIG. 13). This signal causes flip-flop Z505A to change state, outputting the signal $\overline{STOR}$, initiating the storage mode for the output amplifier A405. The new state of flip-flop Z505A in turn resets flip-flop Z506B which again changes the counter control to produce up counting. Initiation of the storage mode by $\overline{STOR}$ also inhibits the enabling signals to the analog switch A402, thereby removing all input signals from the integrator A404. In this condition, the integrator circuit maintains constant its last voltage output level. The enabling of the storage mode turns on the front amplifier of the output amplifier circuit (A102 of FIG. 8B) and as described hereinabove, the output current for the system now is responsive to the amplifier input signal, which is the integrator output signal.

When the storage mode is initiated, the 16-bit counter Z501–Z504 has a value of zero. Storage lasts for the time required for the first two sections of the counter Z501 and 502 to count to their maximum value of 255. At this time, the signal T2 is generated (line 9, FIG. 14) which causes flip-flop Z505A to change state ending the storage mode (indicated by ESTOR, line 10 of FIG. 14), and flip-flop Z506A is set to initiate reset of the integrator A404 through generation of the $\overline{DISCH}$ signal.

In this manner, the division cycle is repeated and an analog output current is produced which represents the ratio of the level channel capacity to the reference channel capacity. This signal is then passed over the two-wire connection to a remote location, providing an indication of the level of materials within a vessel, compensated for variation in their dielectric constant, and substantially unaffected by variations in individual circuit components. In particular, the division circuit arrangement not only avoids use of matched parallel components, by use of a single integrator circuit means comprising an integrating amplifier, capacitor and feedback resistor, but also entirely eliminates the actual values of these components from the ratio by integrating both numerator and denominator; this is accomplished by treating time as a parametric dependent variable, rather than performing fixed period measurements, as more usual in the analog signal processing art.

Those skilled in the art will recognize that while a preferred embodiment of the invention has been fully disclosed and described, numerous improvements and modifications are possible without departure from its essential spirit and scope, and while continuing to fulfill the needs of the art and objects of the invention discussed above. The scope of the invention should therefore not be construed as limited by the preceding exemplary disclosure, but only by the following claims.

I claim:

1. A circuit for performing division of first and second signals, comprising:

integrator circuit means;

means for supplying said integrator circuit means with a first predetermined initial condition $V_i$;

means for controlling operation of said integrator circuit means to integrate a first signal $V_R$, defining a first integrated signal, until a second predetermined signal value is reached;

means for measurement of the time T required for said integration;

means for thereafter supplying said integrator means with a second signal $V_L$;

means for controlling operation of said integrator means to integrate said second signal, defining a second integrated signal, for an equal length of time T;

said integrator at the end of said equal length of time of integration containing an output value $E_o(T)$; and means for outputting a signal proportional to the ratio of the difference between said output value $E_o(T)$ and said second predetermined value to the difference between said second predetermined value and said first predetermined initial condition $V_i$, equal to the ratio of said second integrated signal to said first integrated signal $V_L/V_R$l.

2. The circuit of claim 1 wherein said first signal $V_R$ is a reference signal indicative of the dielectric constant of a material and said second signal $V_L$ is a level signal indicative of the capacitance between a capacitive probe immersed in said material and a ground electrode, whereby the signal proportional to said ratio $V_L/V_R$ is indicative of the level to which said probe is immersed in said material, being compensated for and unaffected by the actual dielectric constant of said material.

3. The circuit of claim 1 wherein said first predetermined initial condition $V_L$ is a reference signal supplied to said integrator and said second predetermined signal value is zero, wherein said integration of said first signal $V_R$ proceeds in a negative direction from said reference level $V_i$ until zero is reached, the time T of said integration being measured, and the integration of said second signal $V_L$ proceeds from zero in a positive direction, said measured time T being used to control the length of time the integration of said second signal $V_L$ is performed, whereby the ratio of said output of said integrator at the end of the integration of said second signal $V_L$ to said reference signal is the ratio of said second signal to said first signal $V_L/V_i$.

4. The circuit of claim 1 wherein the time T of integration of said first signal is measured by counting counts supplied by clock means, said counter proceeding from an initial state in a first direction, and the time of integration of said second signal $V_L$ is controlled by counting an equal number of said clock counts in the opposite direction, and ending said integration of said second signal when the contents of said counter are equal to said initial state of said counter prior to said counting in said first direction.

5. Method of dividing the value of a first signal $V_L$ by the value of a second signal $V_R$ comprising the steps of:

storing an initial condition $V_i$ in an integrator circuit means;

applying said second signal $V_R$ to said integrator circuit means;

measuring a first time period T equal to the time taken for said initial condition $V_R$ to said integrator circuit means to reach a predetermined second value;

applying said first signal $V_L$ to said integrator circuit means for a second time period equal to said first time period T; and providing an indication of a content of said integrator circuit means after said second time period has passed, whereby the ratio of the difference between the contents of the integrator circuit means $E_o(T)$ and the predetermined second value to the difference between the predetermined second value and the predetermined initial condition $V_i$, is the ratio of the first signal to the second signal $V_i/V_R$.

6. The method of claim 5 wherein said integrator circuit means comprises capacitor means.

7. The apparatus of either of claims 5 or 6 wherein said time periods are measured by counting clock pulses supplied to counter means in a first direction during said measurement of said first time period and in the opposite direction during said second time period.

8. The method of claim 5 wherein said second signal $V_R$ is a reference signal and said first signal $V_L$ is a measured signal whereby the ratio of the first and second signals is a compensated measurement signal.

9. The method of claim 8 wherein said first and second signals are capacitive signals, said second signal $V_R$ being representative of the dielectric constant of a material, said first signal $V_L$ being representative of the level of said material in a vessel,
whereby said dielectric constant of said material and individual circuit characteristics of said integrator circuit means are prevented from affecting said ratio determination.

10. The method of claim 9, wherein said capacitance signals are derived across bridge circuits, said bridge circuits being driven by a common oscillator circuit means to generate said capacitative signals.

11. The method of claim 9 wherein the signals output by said bridge circuits are individually amplified prior to application to said integrator means for division.

12. Apparatus for generating a signal representative of the level of materials in a vessel and transmitting said signal over two electrical conductors to remotely-located means for responding to said signal, wherein said remotely-located means also supplies power over said two conductors to said apparatus for generating the signal, comprising means for dividing a first signal indicative of the dielectric constant of the material the level of which is to be measured into a second signal varying with the level of said material, whereby the ratio of said first and second signals is a third signal representative of the level of said material irrespective of its dielectric constant, wherein said means for dividing comprises:
means for supplying an initial condition to integrator means;
means for supplying said first signal to said integrator means, thus modifying said initial condition at a rate dependent on the magnitude of said first signal;
means for measuring the time T taken for said initial condition modified in said integrator to be varied to reach a predetermined value;
means for supplying said second signal to said integrator means for modifying its output;
means for controlling the time said second signal is supplied to said integrator such that said time is equal to the time T taken for said predetermined value to be reached; and
means for outputting a signal indicative of the ratio of the change in the output of said integrator while said second signal was supplied to said integrator to the change in the output of said integrator while said first signal was supplied to said integrator, said ratio being equal to the quotient of said first and second signals.

13. The apparatus of claim 12 wherein said material is contained within a vessel and said first and second signals are capacitive signals measured between first and second probe means respectively, and said vessel.

* * * * *